US007275086B1

(12) United States Patent
Bodnar

(10) Patent No.: US 7,275,086 B1
(45) Date of Patent: Sep. 25, 2007

(54) SYSTEM AND METHOD FOR EMBEDDING A CONTEXT-SENSITIVE WEB PORTAL IN A COMPUTER APPLICATION

(75) Inventor: Eric O. Bodnar, Santa Cruz, CA (US)

(73) Assignee: Intellisync Corporation, San Jose, CA (US)

( * ) Notice: Subject to any disclaimer, the term of this patent is extended or adjusted under 35 U.S.C. 154(b) by 441 days.

(21) Appl. No.: 09/369,490

(22) Filed: Aug. 5, 1999

Related U.S. Application Data

(60) Provisional application No. 60/142,153, filed on Jul. 1, 1999.

(51) Int. Cl.
*G06F 15/16* (2006.01)
(52) U.S. Cl. .................. 709/218; 709/218; 709/219; 709/232; 715/746; 715/744; 715/865; 715/866
(58) Field of Classification Search ............... 709/218, 709/200–220, 20
See application file for complete search history.

(56) References Cited

U.S. PATENT DOCUMENTS

| | | | | |
|---|---|---|---|---|
| 5,845,075 | A * | 12/1998 | Uhler et al. | 707/10 |
| 5,978,817 | A * | 11/1999 | Giannandrea et al. | 345/738 |
| 5,983,268 | A * | 11/1999 | Freivald et al. | 709/218 |
| 6,009,441 | A * | 12/1999 | Mathieu et al. | 715/516 |
| 6,035,119 | A * | 3/2000 | Massena et al. | 717/100 |
| 6,085,224 | A * | 7/2000 | Wagner | 709/203 |
| 6,112,240 | A * | 8/2000 | Pogue et al. | 707/513 |
| 6,122,657 | A * | 9/2000 | Hoffman et al. | 709/201 |
| 6,199,081 | B1 * | 3/2001 | Meyerzon et al. | 707/513 |
| 6,226,642 | B1 * | 5/2001 | Beranek et al. | 707/10 |
| 6,266,681 | B1 * | 7/2001 | Guthrie | 707/10 |
| 6,308,198 | B1 * | 10/2001 | Uhler et al. | 707/10 |
| 6,334,111 | B1 * | 12/2001 | Carrott | 705/14 |
| 6,343,328 | B1 * | 1/2002 | Murphy et al. | 703/23 |
| 6,408,326 | B1 * | 6/2002 | Larsson et al. | 709/201 |
| 6,604,075 | B1 * | 8/2003 | Brown et al. | 704/270.1 |

(Continued)

*Primary Examiner*—Syed A. Zia
(74) *Attorney, Agent, or Firm*—Alston & Bird LLP

(57) ABSTRACT

A Web client/Web server computer system providing a methodology for embedding a context-sensitive Web portal in a computer application operating on the Web client is described. A special key tag type is defined to be monitored by the application, so that the server may control the application, where the special key tag type includes an embedded tag specifying hypertext navigation and includes auxiliary information. The server publishes to the application a Web page having at least one of the special key tags, so that the Web page is displayed at the application. In response to a user request for invoking a particular hypertext link of the published Web page, the application traps the request before the request is processed by the embedded browser. The application may determine whether the invoked hypertext link comprises a special key tag. If the hypertext link does not comprise a special key tag, the application simply passes the hypertext link to the embedded browser for processing. Otherwise, if the hypertext link does comprise a special key tag, the application processes the special key tag in accordance with the auxiliary information, and thereafter passes the embedded tag of the special key tag to the embedded browser for processing. In this manner, the present invention affords a means by which a Web server may and control a parent process (application) directly, thereby allowing an application developer to invoke functionality of the host application, particularly when such functionality would be difficult to emulate through Web pages.

18 Claims, 17 Drawing Sheets

U.S. PATENT DOCUMENTS

| | | | |
|---|---|---|---|
| 6,771,743 B1 * | 8/2004 | Butler et al. | 379/67.1 |
| 2005/0114435 A1 * | 5/2005 | DiPlacido et al. | 709/202 |
| 2006/0031404 A1 * | 2/2006 | Kassab | 709/218 |

* cited by examiner

SYSTEM AND METHOD FOR EMBEDDING A CONTEXT-SENSITIVE WEB PORTAL IN A COMPUTER APPLICATION

RELATED APPLICATIONS

The present application claims the benefit of priority from and is related to the following commonly-owned U.S. provisional application: application Ser. No. 60/142,153, filed Jul. 1, 1999. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computers and, more particularly, to system and methods for facilitating delivery of user-relevant information to desktop application software.

The first personal computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs." In both cases, maintaining security and controlling what information a user of a personal computer can access was relatively simple because the overall computing environment was limited and clearly defined.

With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer™ or Netscape Navigator™) or other "Internet applications." Browsers and other Internet applications include the ability to access a URL (Universal Resource Locator) or "Web" site. The explosive growth of the Internet had a dramatic effect on the LANs of many businesses and other organizations. More and more employees need direct access through their corporate LAN to the Internet in order to facilitate research, competitive analysis, communication between branch offices, and send e-mail, to name just a few.

Each URL is used to specify the location of a file held on a remote machine and is composed of several distinct components. For example, the URL of http://host/file.html includes three distinct components. The first component, http, specifies the protocol (here, "HTTP" or HyperText Transport Protocol) that is to be used to access the target file. Other access protocols can be specified by a URL. For example, the URL of ftp://ftp.starfish.com/pub/docs/samples specifies access to files via "FTP" (File Transfer Protocol). This specifies a link for accessing the file directory docs/samples on the machine ftp.starfish.com.

The second component, host, indicates the name of the remote machine; this can be expressed as either a symbol name (e.g., starfish.com) or a numeric IP (Internet Protocol) address such as 123.200.1.1. The final component, file.html, provides the path name of the target file—that is, the file which the hypertext link is to be made. The file is referenced relative to the base directory in which Web pages are held; the location of this directory is specified by the person who has set up the Web server (i.e., "Webmaster").

The majority of content available on the Internet is represented in "HTML" documents which, in turn, are read or accessed by Web browsers. In particular, the HTML or Hypertext Markup Language is an ASCII text-based, script-like language used to create the documents for the World Wide Web. Although most browsers will display any document that is written in plain text, HTML documents afford several advantages. In particular, HTML documents may include rich formatting and graphics, as well as hypertext links or "hyperlinks" to other documents.

Markup languages, such as HTML, are used to describe the structure of the document. HTML is used to mark various elements in a document, including headings, paragraphs, lists, tables, and the like. To achieve this, an HTML document includes formatting commands or "tags" embedded within the text of the document which serve as commands to a browser. Here, HTML tags mark the elements of a file for browsers. Elements can contain plain text, other elements, or both. The browser reading the document interprets these markup tags or commands to help format the document for subsequent display to a user. The browser thus displays the document with regard to features that the viewer selects either explicitly or implicitly. Factors affecting the layout and presentation include, for instance, the markup tags used, the physical page width available, and the fonts used to display the text.

The design of HTML tags is relatively simple. Individual HTML tags begin with a < ("less than") character and end with a > ("greater than") character, such as <title> which serves to identify text which follows as the title of a document. HTML tags are not case-sensitive (with the exception of HTML escape sequences) and are often used in symmetric pairs, with the final tag indicated by the inclusion of a / (slash) character. For instance, the <title> tag represents a beginning tag which would be paired with a </title> ending tag. These paired commands would thus be applied to the text contained within the beginning and ending commands, such as <title> My Sample Title </title>. The <B> tag, on the other hand, informs browsers that the text which follows is to be in bold type. This bolding is turned off by the inverse markup tag </B>. In contrast to these paired or "container" tags, separator tags are used unpaired. For example, the command <br> is employed by itself to insert a line break. Browsers generally ignore extra spaces and new lines between words and markup tags when reading the document. In other words, "white space" characters, such as tabs, spaces, and new line characters, are generally ignored in HTML. Leaving a blank line in one's document, for instance, generally does not create a blank line when the document is displayed in a browser, unless one uses the "preformatted" HTML tag (<pre> and </pre>). Finally, not all tags are supported by all Web browsers. If a browser does not support a tag, it (usually) just ignores it.

Since the advent of the Internet, most companies have established a primary goal of maintaining a close one-to-one relationship with their customers through use of a company Web site—that is, a place on the Web where customers can ask questions about the company's products, read news pertaining to those products (e.g., new features/updates), or even shop for accessories for the company's products. Typically, in order to get one's customers attention, a company would expand a fair amount of effort trying to convince its customers to come to its Web site or company "portal." The approach is problematic, however.

Just as there are only so many (manageable) channels on a television, there is, similarly, a limited number of places that people will think to go on the Internet. The large, well-known Web sites—the "Yahoos" and the "Excites" of the online world—have substantial brand-name recognition and are, therefore, often the default portals (e.g., "home" page) set by users in their browsers. These are places that people will think of to go. Trying to get customers to change their "home" pages to a product-specific Web site is a particularly difficult problem, however. Users would instead prefer to have their browsers go to a more-generic site as a home page. Despite the challenges posed by this problem, there exists great interest in finding a way to bring a company's portal to the desktop of its customers.

SUMMARY OF THE INVENTION

A Web client/Web server computer system providing a methodology for embedding a context-sensitive Web portal into a computer application is described. An exemplary embodiment includes a Web client comprising a personal computer or workstation operating a Web browser (e.g., Netscape Navigator or Microsoft Internet Explorer) with connectivity to the Internet via a communication layer, such as Microsoft Winsock (Winsock.dll)—a Windows implementation of TCP/IP Transmission Control Protocol/Internet Protocol (TCP/IP). The methodology of the present invention is invoked with the context that an application (i.e., parent process on a client machine) having an embedded browser view ("portal") is available for participating in the process.

At the outset, a special tag type ("key" tag) is defined for allowing a Web server to communicate with and control a particular desktop application (i.e., user application executing at a client machine). Next, the Web server publishes to the desktop application a Web page (e.g., HTML page) that includes at least one of the key tags. The desktop application itself includes an embedded browser window ("portal") that is capable of rendering the Web server-published Web page (as well as any other HTML page). At this point, the embedded browser window proceeds to display the published Web page. Now, at the desktop application, the user invokes or "clicks" on a Web link that is associated with one of the key tags. Before the tag is acted upon by the browser (portion of the embedded portal), the application (parent process) traps the tag. This is done by trapping "browse (navigate) to" events which occur in response to a user clicking a hyperlink. Because the embedded portal is being hosted by the desktop application (e.g., as a Microsoft Internet Explorer child control), the desktop application is, in fact, a parent process which may "hook" into the embedded portal. In particular, the application is interested in obtaining a notification every time the embedded portal is about to navigate to a new location (typically, in response to a user clicking on a Web link rendered at the embedded portal). Therefore, the application is able to monitor the embedded portal by trapping "browse to" events that occur at the portal.

Upon trapping a "browse to" event, the application will determine whether the trapped tag (associated with the trapped event) indeed includes any relevant key tags. In other words, the application itself will decide whether the trapped tag contains any information that is relevant to the application itself. Here, the application performs a simple substring search on the trapped tag, for determining whether it comprises a keyword identifier in a key tag, such as a defined keyword identifier of |ACCEPT|. Those skilled in the art will appreciate that a multitude of other keywords may be employed; however, it is preferable to choose a keyword which is undefined in HTML, so that the tag will simply be ignored by the HTML browser (engine portion). If the keyword is not found (i.e., the tag is not a key tag), the trapped tag is simply passed through to the browser (engine portion) for appropriate browser processing (e.g., navigating to a new Web address). On the other hand, if the keyword is found, then the tag will be processed as a special key tag.

Processing of the key tag proceeds as follows. The application invokes its own internal routines (e.g., handlers) that are responsive to the auxiliary information, such as updating the system registry in a predefined, reserved area based on the name/value pairs that are extracted from the tag. Additionally at this point (or at a later point in time), specific functionality of the application may be invoked, as required by the new registry entries. For instance, a registration or setup "Wizard" of the application may be triggered, as previously illustrated. Thus, application functionality may be invoked directly (e.g., through direct invocation of handlers) or indirectly (e.g., through application response to updating of the system registry). After processing of the name/value pairs from the variable data section, the system may simply pass the "real" (i.e., valid) HTML tag to the browser (engine portion), for appropriate processing as an HTML tag. Optionally, however, the parent process may first append information to the real tag (e.g., based on the processed name/value pairs), but do so in a manner which preserves validity of the tag. In other words, the parent process has the option of enhancing or otherwise modifying the real tag but will do so in a manner which will allow the tag to be correctly processed by the browser. Therefore, the method proceeds with optional enhancement of the real tag, and delivery of the real tag (with or without enhancements) to the browser (engine portion) for processing. Typically, the real HTML tag would be modified by tacking on name/value pairs that are meaningful to the Web server, in a manner similar to how queries are passed from a browser to a Web server (e.g., a "find" query submitted to Yahoo by a browser). Thereafter, the method may repeat processing for the next "browse to" event, or terminate if no further tags remain to be processed.

Succinctly stated, the methodology includes method steps of defining a special key tag type to be monitored by the application, so that the server may communicate and control the application, where the special key tag type includes an embedded tag specifying hypertext navigation and includes auxiliary information; publishing to the application a Web page having at least one of the special key tags, so that the Web page is displayed at the application; receiving a user request for invoking a particular hypertext link of the published Web page; in response to the request, trapping the request by the application before the request is processed by the embedded browser; determining whether the invoked hypertext link comprises a special key tag; if the hypertext link does not comprise a special key tag, passing the hypertext link to the embedded browser for processing; otherwise, if the hypertext link does comprise a special key tag, allowing the application to process the special key tag in accordance with the auxiliary information, and thereafter passing the embedded tag of the special key tag to the embedded browser for processing.

By allowing the parent process (application) to act on information monitored from the HTML pages displayed at the embedded portal, the present invention affords a means by which a Web server may communicate with and control a parent process (application) directly. As a result, an application developer may use the approach to invoke functionality of the host application, particularly when such functionality would be difficult to emulate through Web pages, thereby achieving an embedded portal presenting individualized, highly-relevant content to the particular user.

2B is a block diagram illustrating an exemplary configuration of a computer system of the present invention, which includes both Web client and Web server components.

Figure 3A:
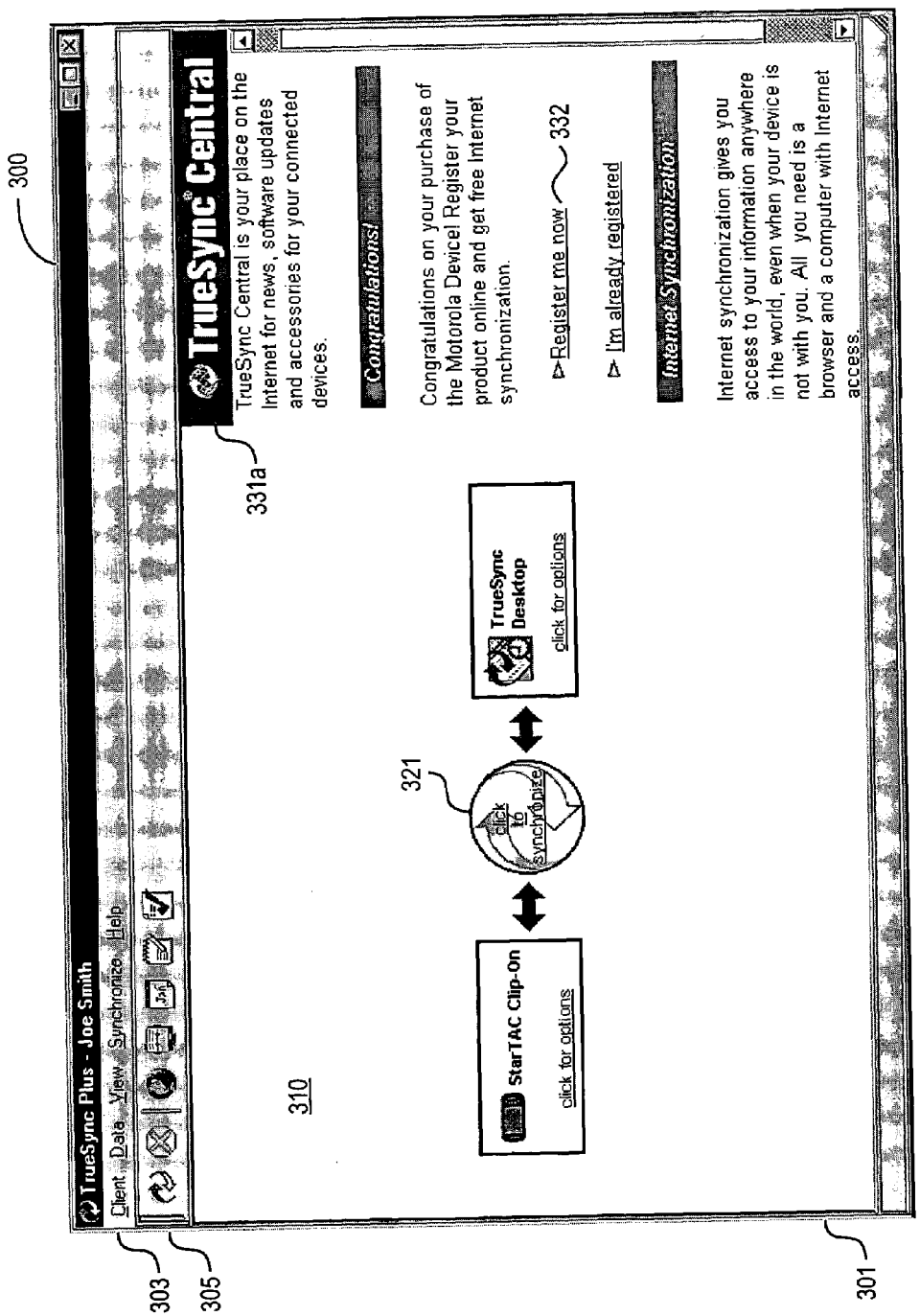

FIG. 3A is a bitmap screen shot illustrating a desktop application user interface, which is suitable for implementing an embedded portal.

Figure 3B:
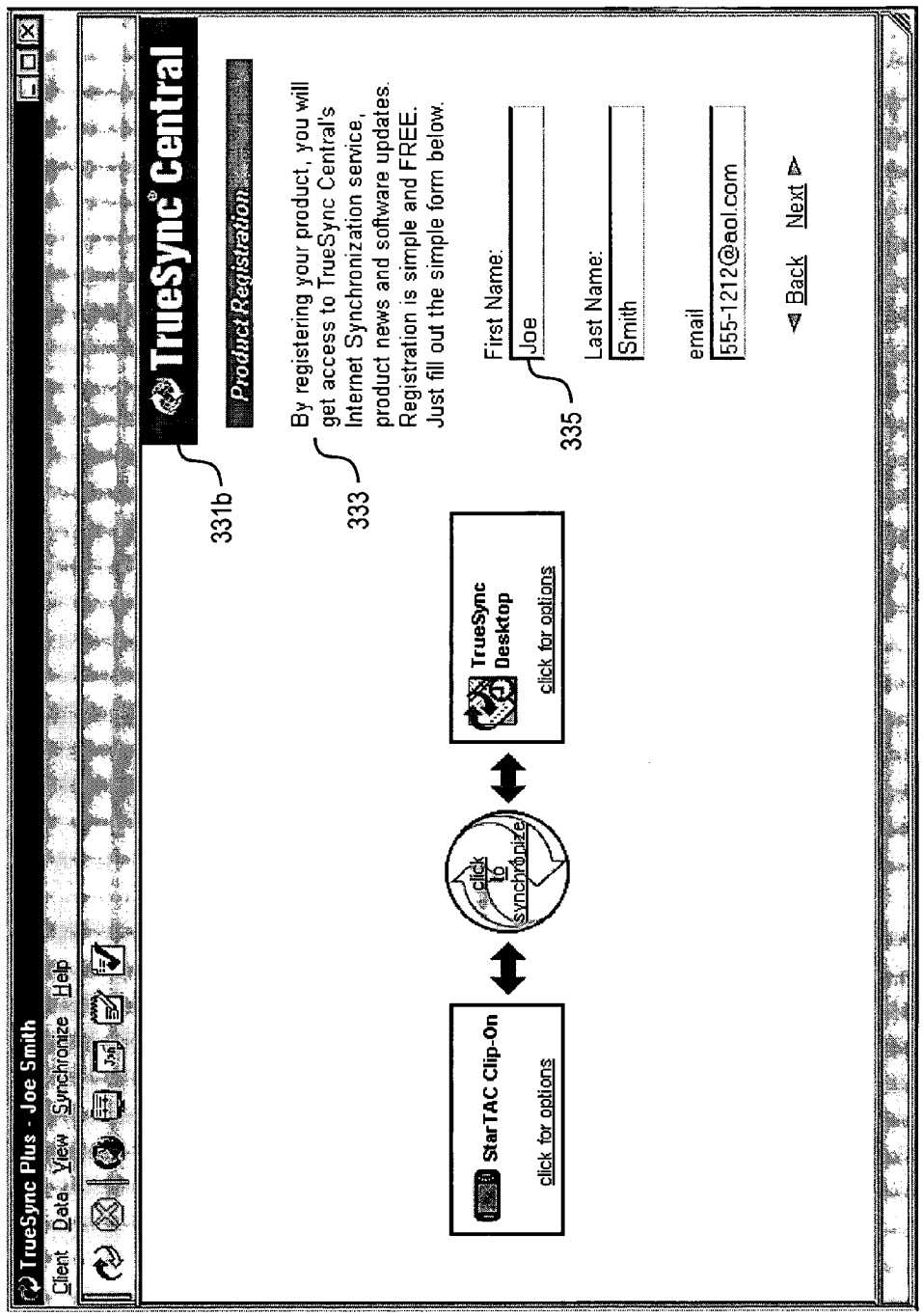
Figure 3C:
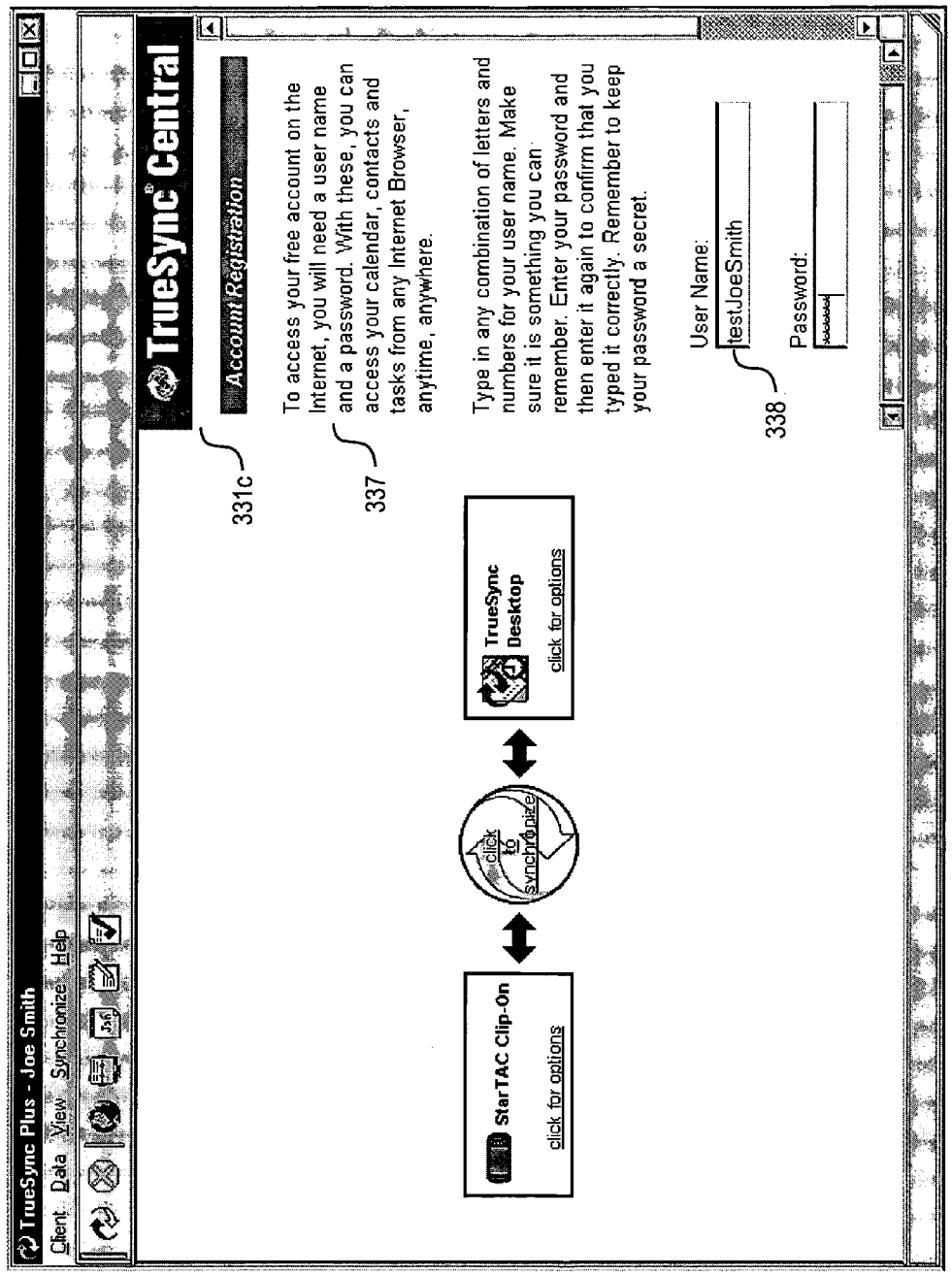

FIGS. 3B-C are bitmap screen shots illustrating adaptation of the user interface of FIG. 3A to incorporate the embedded portal of the present invention.

Figure 4A:
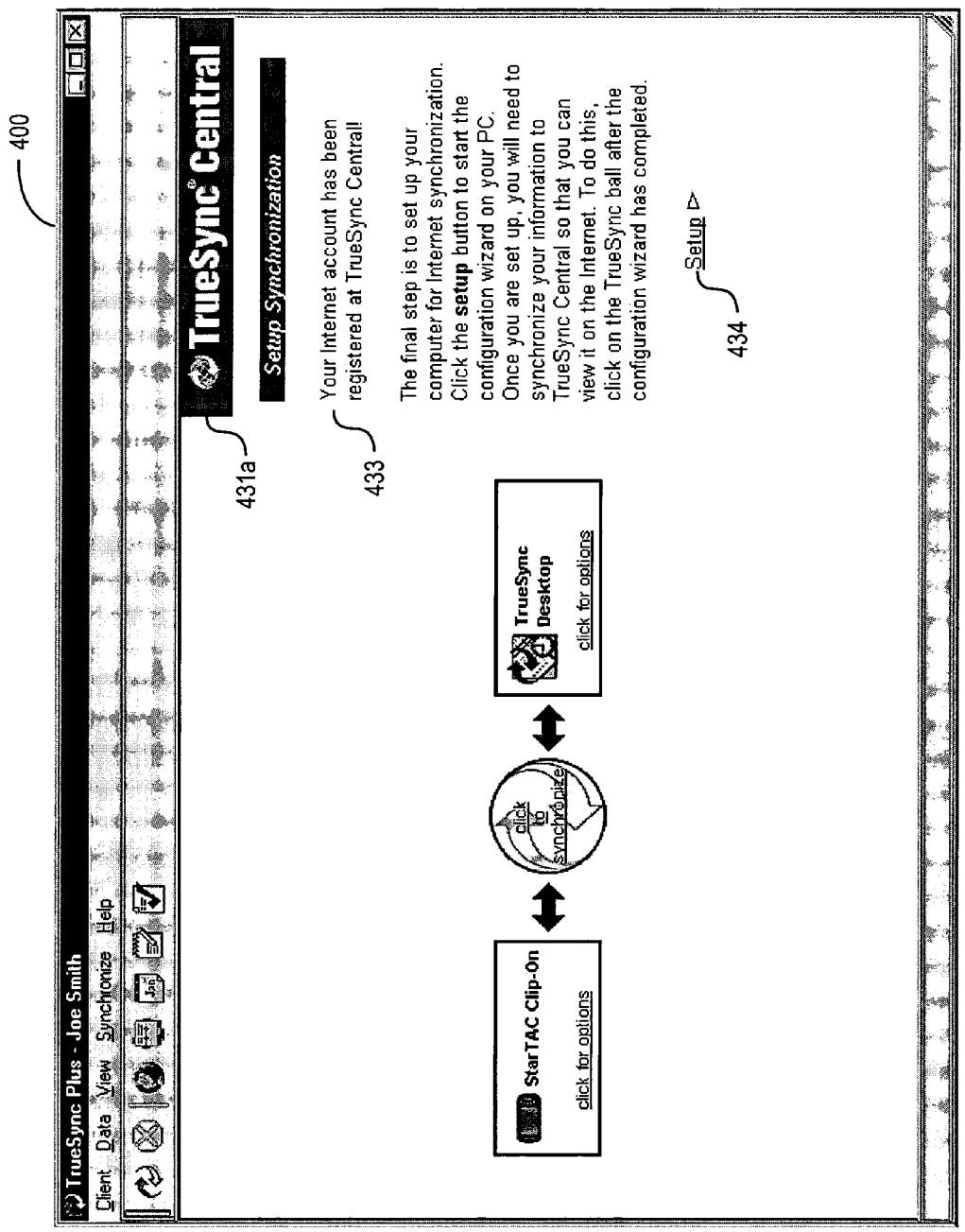
Figure 4B:
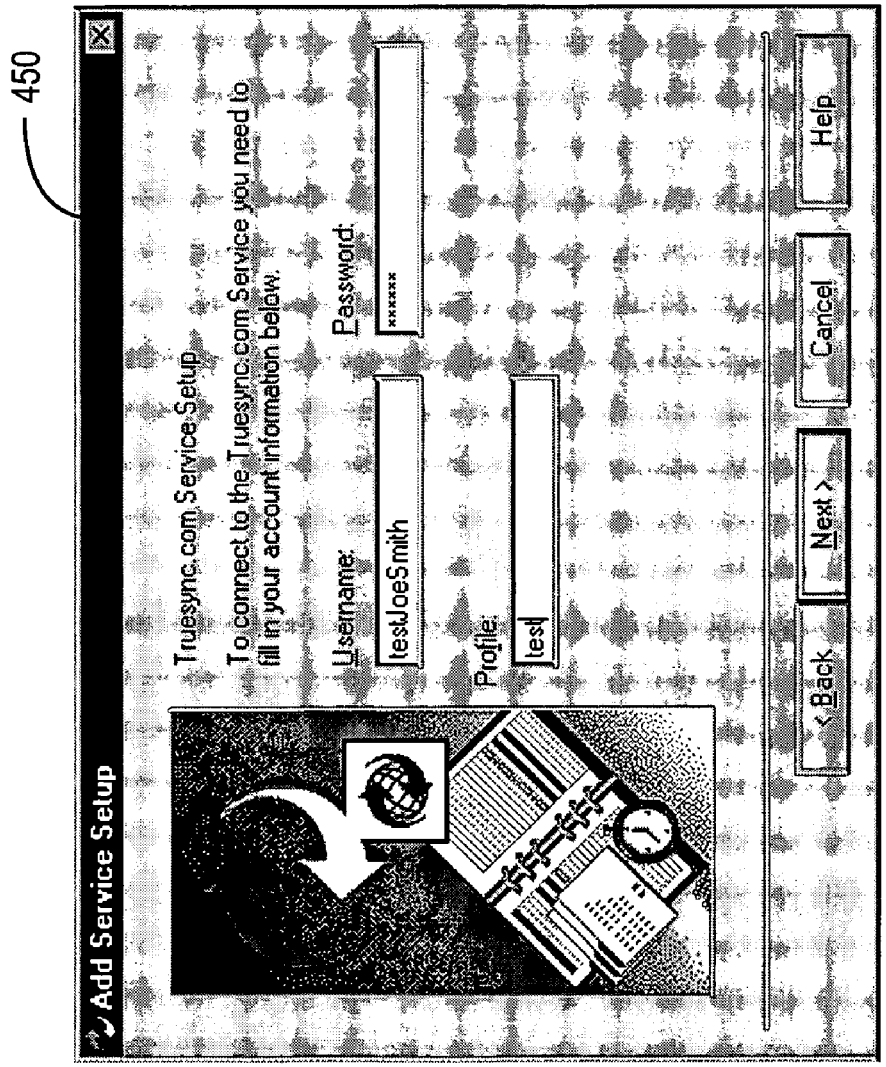

FIGS. 4A-B are bitmap screen shots illustrating use of "key tags" for controlling a target application ("parent process").

FIGS. 5A-D are bitmap screen shots illustrating sample views of an application that includes an embedded portal presenting customized information for a particular user (e.g., one that has completed online registration).

Figure 6:
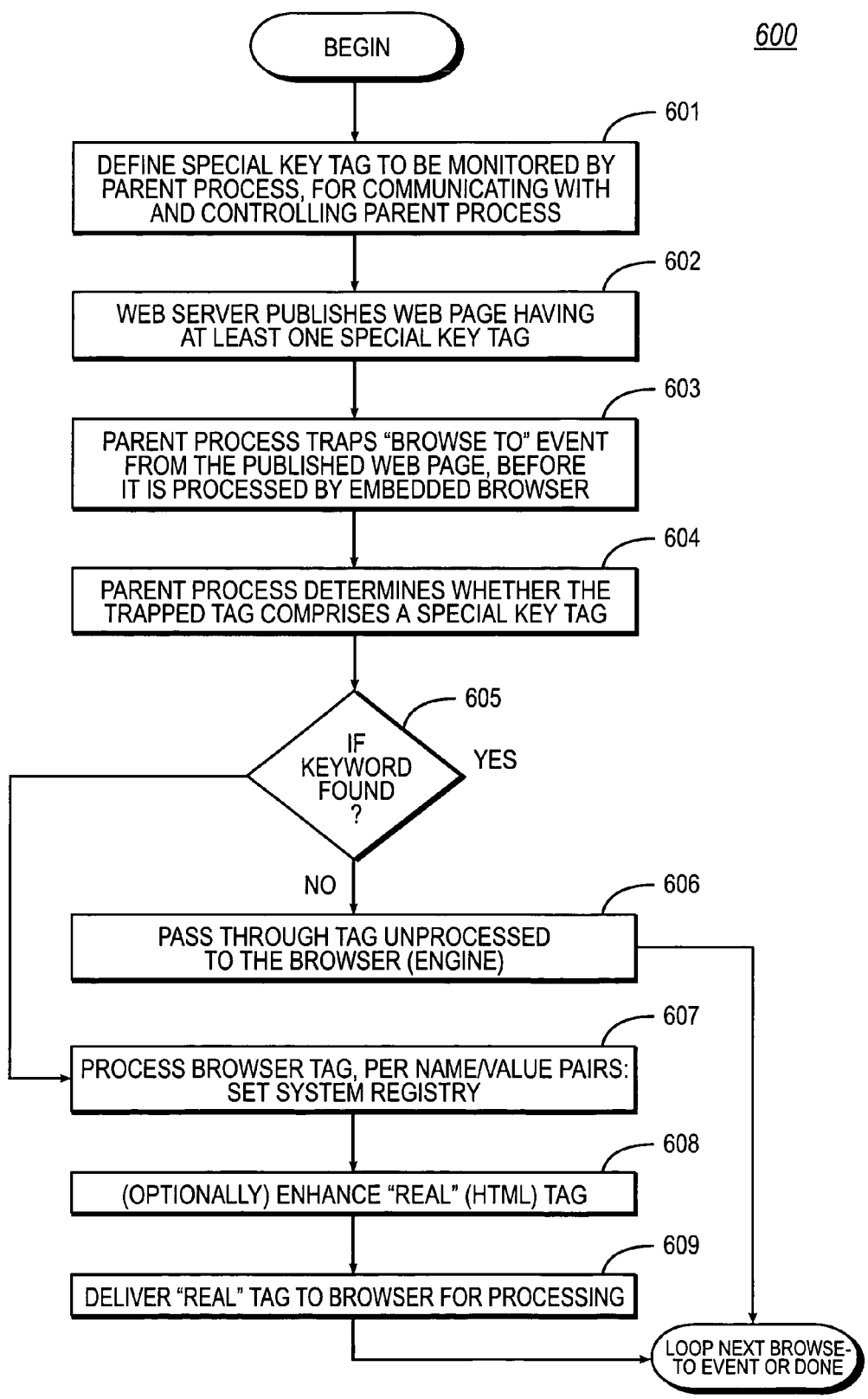

FIG. 6 is a flowchart illustrating the overall methodology of the present invention for providing a portal embedded into a target application.

Figure 7:
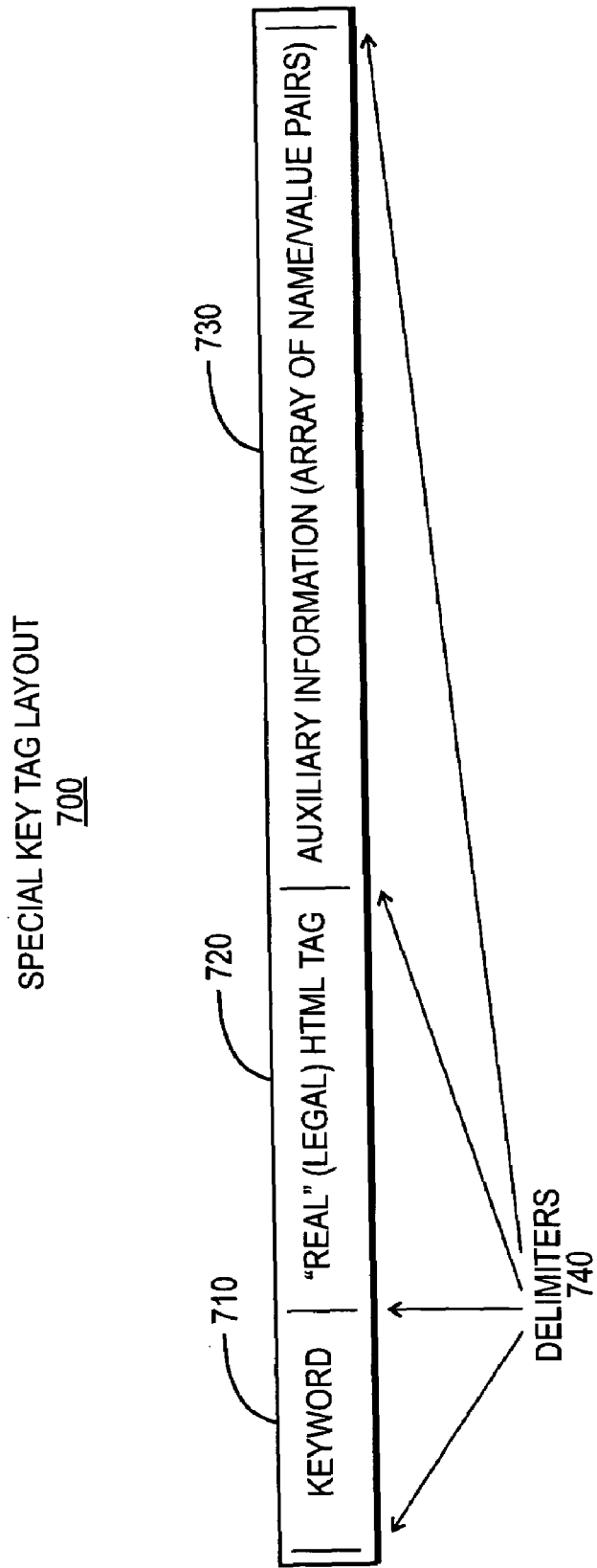

FIG. 7 is a block diagram illustrating layout for a key tag (data structure) of the present invention.

Figure 8A:
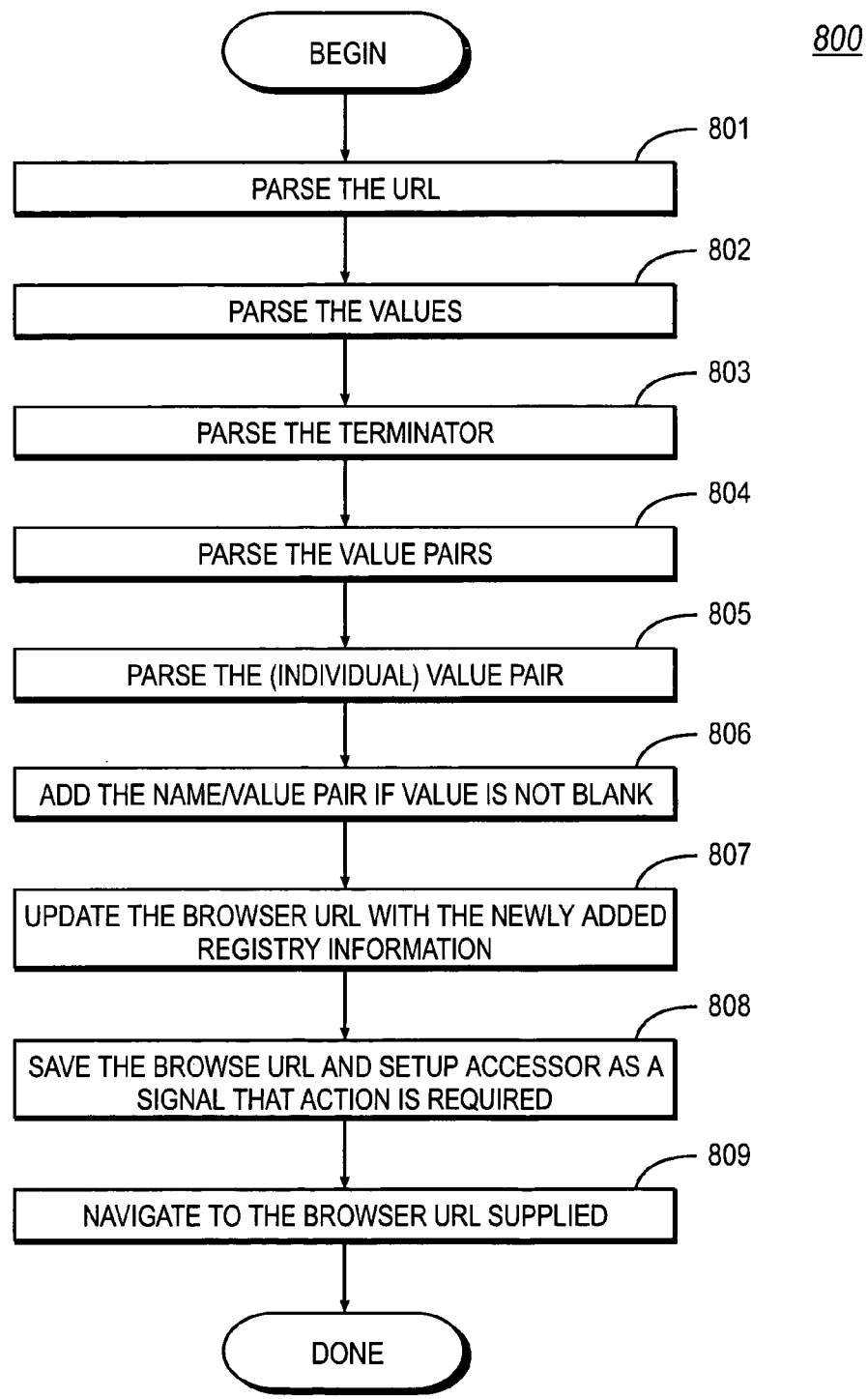
Figure 8B:
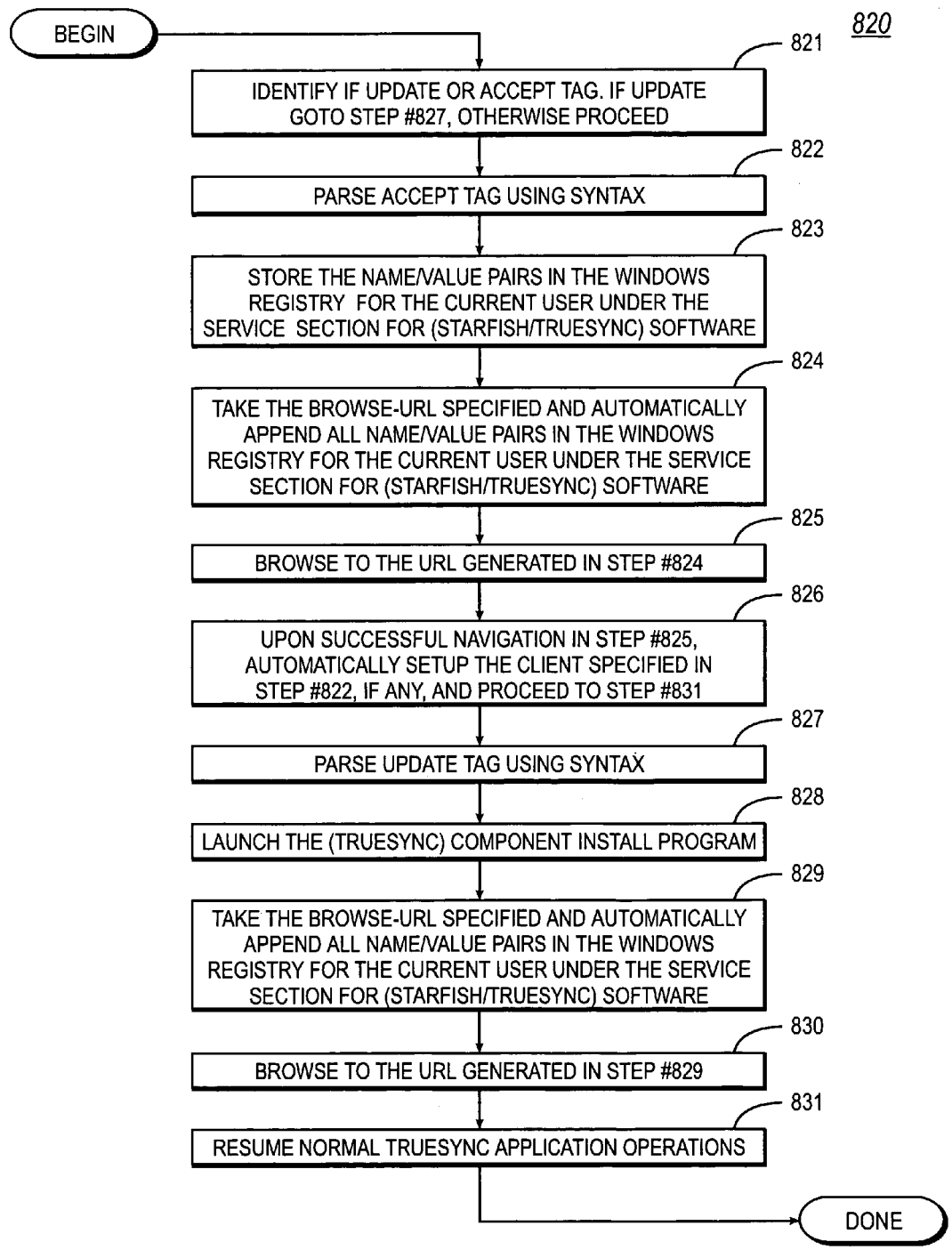
Figure 8C:
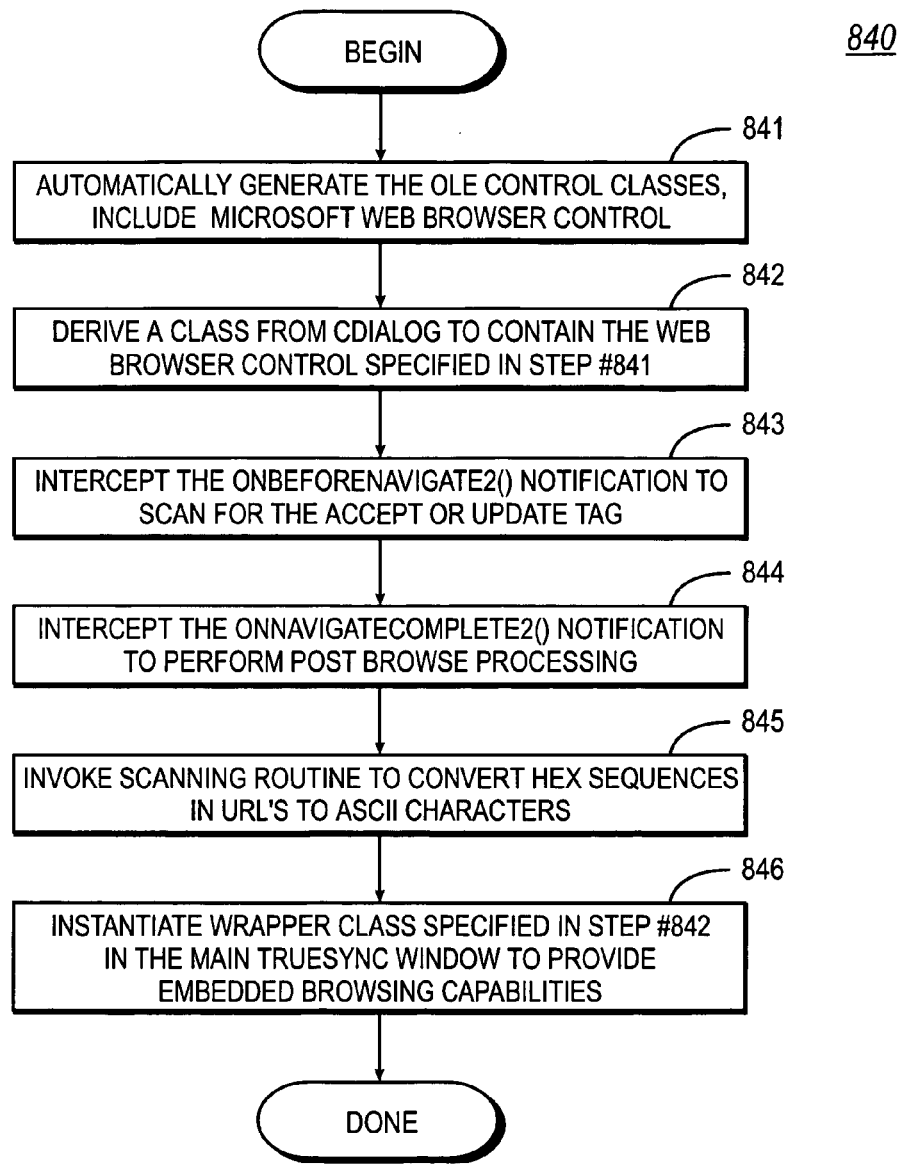

FIGS. 8A-C are flowcharts illustrating specific implementation of the methodology of the present invention.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows running on an IBM-compatible PC. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Computer-Based Implementation

A. Basic System Hardware (e.g., For Desktop and Server Computers)

Figure 1:
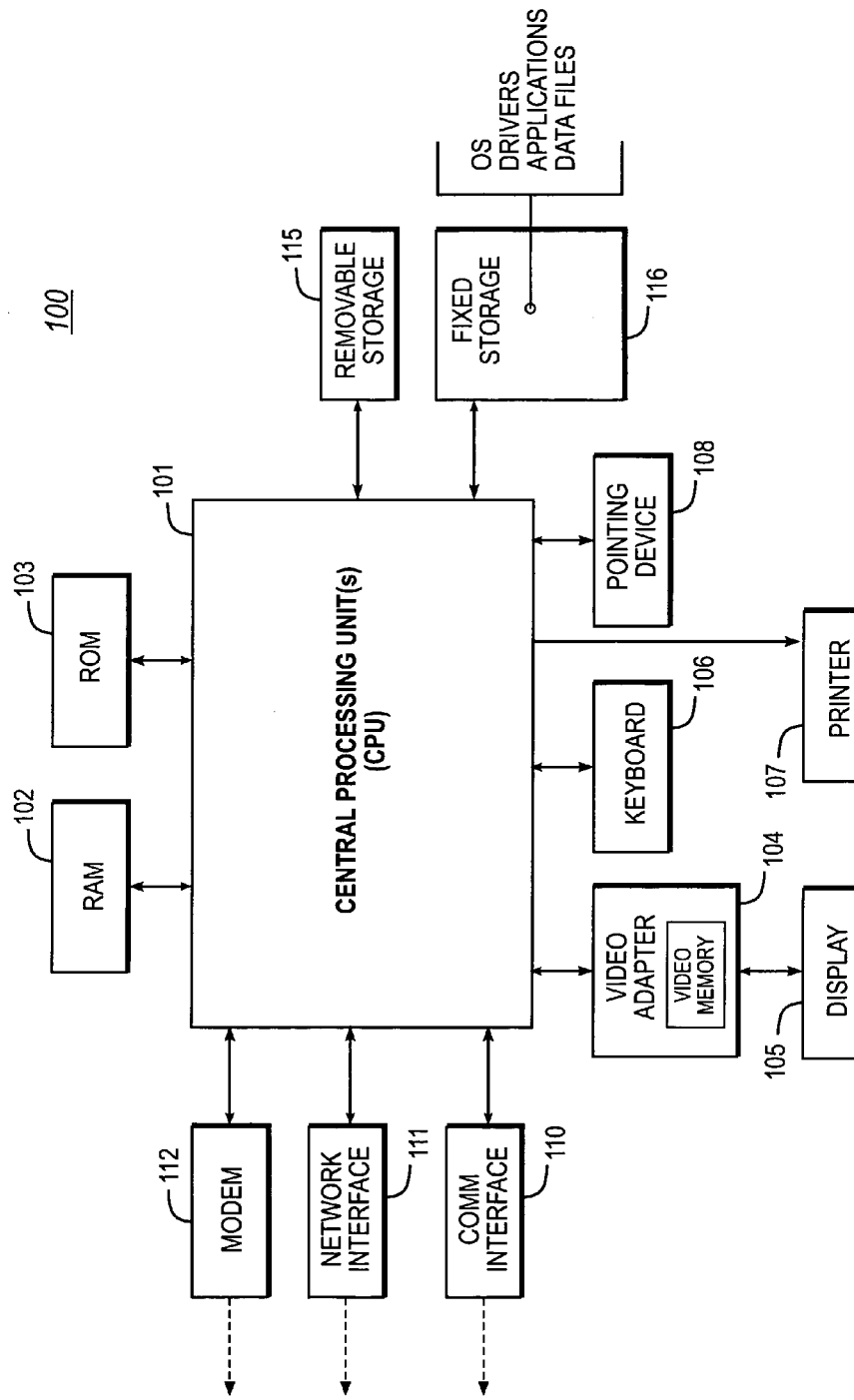
FIG. 1 is a very general block diagram of a conventional or general-purpose computer system, such as an IBM-compatible personal computer (PC) or server computer (or other similar platform), which may be employed for implementing the present invention.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processor unit(s) (CPU) 101 coupled to a random-access memory (RAM) 102, a read-only memory (ROM) 103, a keyboard 106, a pointing device 108, a display or video adaptor 104 connected to a display device 105, a removable (mass) storage device 115 (e.g., floppy disk), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen device 105. Likewise, the pointing device 108, such as a mouse, track ball, pen device, or the like, permits selection and manipulation of objects on the display screen. In this manner, these input devices support manual user input for any process running on the system.

The computer system displays text and/or graphic images and other data on the display device 105. Display device 105 is driven by the video adapter 104, which is interposed between the display 105 and the system. The video adapter 104, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

The above-described system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 2A:
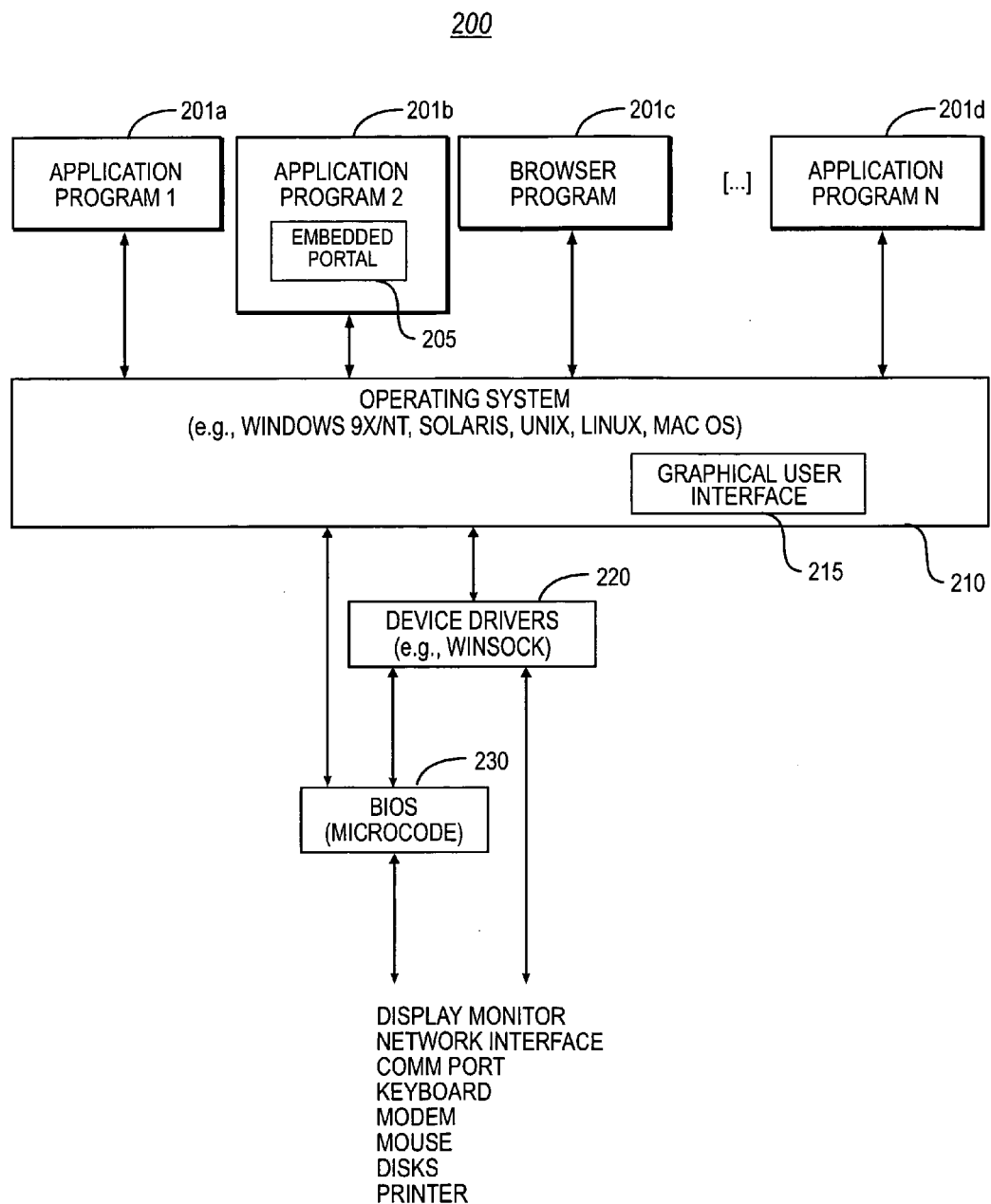
FIG. 2A is a block diagram illustrating a software system for controlling the computer system of FIG. 1.

Illustrated in FIG. 2A, a computer software system 200 is provided for directing the operation of the computer system 100. Software system 200, which is stored in system memory 102 (i.e., random access or RAM) and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 9x, by Microsoft® Windows NT, or by Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computers of Cupertino, Calif.).

Of particular interest, at least one of the application programs 201 of the software system 200 is modified to include an "embedded portal" 205 of the present invention, as shown by application program 201b. As also shown, client application software 201 preferably includes Web browser software 201c (e.g., Microsoft Internet Explorer 5.x available from Microsoft Corporation of Redmond, Wash.), for supporting an embedded browser view (as described below), which communicates through a communication layer or driver (e.g., Winsock) with the Internet.

C. Web Client (Browser)/Web Server Configuration

Figure 2B:
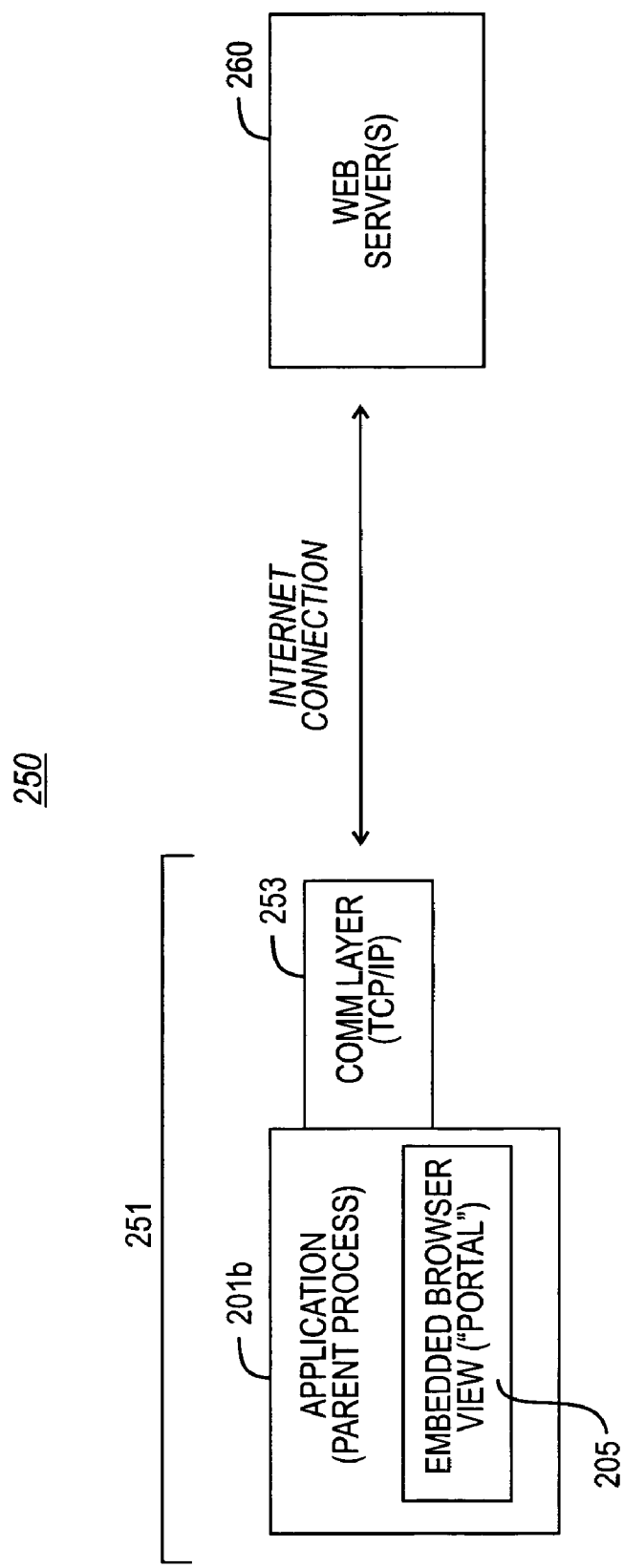

FIG. 2B is a block diagram illustrating an exemplary configuration of the system 250 of the present invention, which includes both Web client and Web server components. The figure illustrates a Web client 251 with an Internet connection to one or more Web servers 260. For instance, the client 251 may comprise the above-described application 201b, including the embedded browser or view 205, operating on a personal computer or workstation (e.g., system 100) having a modem and/or network interface card (NIC) which communicates with the Internet via a communication layer 253, such as Microsoft Winsock (Winsock.dll)—a Windows implementation of Transmission Control Protocol/Internet Protocol (TCP/IP). In a complementary fashion, each Web server comprises a server computer (e.g., such as system 100) operating Web server software (e.g., Apache™ Web server) running under a server operating system (e.g., Linux™). At least to the extent of processing user-invoked hypertext links, the application 201b is interposed (functionally) between the embedded browser 205 and the communication layer 253. In this fashion, the application (parent process) can trap and process all communications between the embedded browser 205 (i.e., child process) and the communication layer 253 (and, hence by implication, the Web servers 260). Construction and operation of the embedded portal 205 of the present invention, including supporting methodologies, will now be described in further detail.

Context-Sensitive Embedded Web Portal

A. HTML Documents and Client/Server HTTP Communication

Before describing the methodology of the present invention in further detail, it is helpful to first review in further detail the process of transmitting information to Web browser clients, including reviewing both the internal organization of HTML documents and the operation of the underlying protocol (HTTP).

1. Organization of HTML Documents

Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications.

The basic layout of an HTML document, including required elements, is illustrated in the following simple HTML document.

<HTML>

<HEAD>

<TITLE>Title of the Web page </TITLE>

</HEAD>

<BODY>

An example of a simple

<B>Web</B> page.

</BODY>

</HTML>

As illustrated, required elements include the <HTML>, <HEAD>, <TITLE>, and <BODY> tags, together with any corresponding end tags. The tags used function as follows. The first pair of tags, <HTML> </HTML>, defines the extent of the HTML markup text. The <HEAD> </HEAD> tag pair contains descriptions of the HTML page; this meta information is not displayed as part of the Web page. The <TITLE> </TITLE> tag pair describes the title of the page. This description is usually displayed by the browser as the title of the window in which the Web page is displayed. This information is also used by some search engines to compile an index of Web pages. The next tag pair, <BODY> </BODY>, delimits the body of the Web page. In the body is the text to be displayed as well as HTML markup tags to hint at the format of the text. For example, the <B> </B> tag pair displays the enclosed text in a bold typeface. Further description of HTML documents is available in the technical and trade literature; see e.g., Ray Duncan, *Power Programming: An HTML Primer*, PC Magazine, Jun. 13, 1995, the disclosure of which is hereby incorporated by reference.

2. Hypertext Transport Protocol (HTTP) Communication

HTTP is a standardized transfer protocol that serves as the foundation of the World Wide Web. This request/response protocol used on top of TCP (Transmission Control Protocol) carries commands from browsers to servers and responses from servers back to browsers. HTTP is not a protocol not for transferring hypertext per se but for transmitting information with the efficiency necessary to make hypertext jumps. The data transferred by the protocol can be plain text, hypertext, audio, images, or any Internet-accessible information.

HTTP is a transaction-oriented client/server protocol; it treats each transaction independently. A typical implementation creates a new TCP connection between a client and a server for each transaction, then terminates the connection as soon as the transaction completes. Since the protocol does not require this one-to-one relationship between transaction and connection lifetimes, however, the connection can stay open so that more transactions can be made. This transaction-based approach of HTTP is well-suited to its typical application. A normal Web session involves retrieving a sequence of pages and documents. The sequence is, ideally, performed rapidly, and the locations of the various pages and documents may be widely distributed among a number of servers, located across the country or around the globe.

In typical HTTP configuration, a client, such as a Web browser, initiates a request (HTTP message) for a resource, for instance, from a Web server where a desired home page is located. The client opens a direct connection that is an end-to-end or direct connection between the client and the server. The client then issues an HTTP request. The request consists of a specific command (referred to as a method), a URL, and a message containing request parameters, information about the client, and perhaps additional content information. When the server receives the request, it attempts to perform the requested action and returns an HTTP response. The response includes status information, a success/error code, and a message containing information about the server, information about the response itself, and possible body content. The TCP connection is then closed.

Instead of the end-to-end TCP connection between a client and a server, an alternative configuration employs one or more intermediary systems with TCP connections between adjacent systems. Each intermediary system acts as a relay, so that a request initiated by the client is relayed through the intermediary system(s) to the server, and the response from the server is relayed back to the client. A "proxy," for example, is an intermediary system which acts on behalf of other clients and presents requests from other clients to a server. There are several scenarios that call for the use of a proxy. In one scenario, the proxy acts as an intermediary through a firewall. In this case, the server authenticates itself to the firewall to set up a connection with the proxy. The proxy accepts responses after they have passed through the firewall.

Clients and servers communicate using two types of HTTP messages: request and response. A request message is sent by a client to a server to initiate some action. Exemplary actions include the following.

GET: A request to fetch or retrieve information.

| | |
|---|---|
| POST: | A request to accept the attached entity as a new subordinate to the identified URL. |
| PUT: | A request to accept the attached entity and store it under the supplied URL. This may be a new resource with a new URL, or it may be a replacement of the contents of an existing resource with an existing URL. |
| DELETE: | Requests that the origin server delete a resource. |

The server, in response to a request, returns a response message. A response message may include an entity body containing hypertext-based information. In addition, the response message will specify a status code, which indicates the action taken on the corresponding request. Status codes are organized into the following categories:

| | |
|---|---|
| INFORMATIONAL: | The request has been received and processing continues. No entity body accompanies this response. |
| SUCCESSFUL: | The request was successfully received, understood, and accepted. |
| REDIRECTION: | Further action is required to complete the request. |
| CLIENT ERROR: | Request contains a syntax error or request cannot be fulfilled. |
| SERVER ERROR: | The server failed to fulfill an apparently valid request. |

Further description of HTTP is available in the technical and trade literature; see e.g., William Stallings, *The Backbone of the Web*, BYTE, October 1996, the disclosure of which is hereby incorporated by reference.

B. Bringing the Portal to the User

The approach of the present invention is to invert the previously-described company portal problem: instead of bringing the user to a company's portal, the portal is brought to the user. In other words, instead of figuring out how one can get users to come to a company's Web site, the approach of the present invention is to instead figure out a mechanism for bringing the company's Web portal to the user. In particular, the approach of the present invention is to place a company's portal window (e.g., product specific in nature) inside an application that the user is already using at the desktop. This is done, in part, by embedding a browser window—an HTML view of the Internet—inside a desktop application.

In the currently-preferred embodiment, an embedded browser window is placed in newspaper-column fashion, at a particular screen location of the desktop application. The actual screen location chosen is typically one likely to be displayed for at least a significant period of time, during ordinary use of the application. Consider, for instance, the desktop application user interface (window) 300, illustrated in FIG. 3A. As shown, the user interface 300 includes typical user interface elements, including a window frame 301, main menu 303, toolbar 305, and client area 310. The client area 310 is typically where the bulk of the application's output is displayed. In the example of FIG. 3A, the application comprises Starfish TrueSync™ Plus (available from assignee Starfish Software, Inc.) which includes synchronization functionality. Briefly, user operation of the application is as follows. After configuring a particular synchronization session (e.g., synchronize information from a Motorola StarTAC® cellular phone to a desktop computer), the user selects ("clicks") the synchronize ball 321 to launch the synchronization process.

Ordinarily, after the user clicks the synchronize ball 321, the application would undertake a relatively lengthy synchronization process, with the synchronize ball 321 "spinning" (i.e., displaying feedback) for indicating that synchronization is proceeding. Note, however, that the user interface, which has entered a fairly static phase, may be put to much better use. In particular, the user interface 300 is modified to include a newspaper-column display frame or "punch-out" Web portal 331—an embedded portal (shown initially as 331a)—where information may be sent to the customer. It is particularly advantageous to send product-specific information to the user via the embedded portal.

In order to make the experience appear relevant to the user (other than a static Web page), additional effort is required beyond simply embedding an HTML frame inside an application. In particular, the embedded portal is configurable dynamically, so that the content displayed by the embedded portal is highly relevant to the individual user. In a preferred embodiment, the embedded portal is configured by the program which installed the application (i.e., the installation program) as well as the application itself at runtime. In this manner, the application can issue dynamic requests to the company's Web server, in the form of name/value pairs, which contain specific information about the exact context in which the embedded portal appears at the user's desktop. For example, the name/value pairs may store a customer name and account number, a list of what products (as well as what features) the user has installed, and the like. In particular, the dynamic information which is generated is highly pertinent to exactly what the customer has. Therefore, instead of requiring the user to point his or her browser to a company's Web site and then further configure his or her browser for obtaining information most pertinent to the user, the system automatically configures the embedded portal to bring the most relevant information to the user (e.g., product-specific, feature-specific information).

C. Exemplary User Interface (UI)

An exemplary implementation of the present invention is perhaps best illustrated by way of example. The following illustrates use of the technology for implementing an Internet-based online user registration for an application. Instead of simply "nagging" the customer to register, the embedded portal may be used to entice the customer, by offering something of value to the customer. In the following example, for instance, the embedded portal will offer the user a free account to an Internet-based synchronization server, which allows the user to synchronize information to and from the Internet.

Returning to FIG. 3A, the embedded portal 331 (shown as 331a) occupies about one-third of the right side of the screen. Also, the embedded portal does not appear like a Web browser (e.g., it does not have forward/back arrows (at least initially), separate frame, and so forth). Nevertheless, the embedded portal 331 is an Internet Explorer-controlled browser view. As shown in its initial position in FIG. 3A, the embedded portal 331 includes initial content attempting to entice the user to register the product online. The HTML or Web pages themselves are, of course, a choice of implementation; the embedded portal itself does not require that any particular content be displayed. Note further that, in the currently-preferred embodiment, the HTML pages are actually dynamically published by the target Web server (i.e., the server computer at the company Web site that supplies the HTML pages to the embedded portal).

For this example, the content shown is fairly generic "sign up" content, which is attempting to entice the user to sign up or register. At this point, however, the Web server already knows that the user is a StarTAC® clipOn user and is running the TrueSync™ Desktop because the HTML address requested (i.e., the specific HTTP request issued by the embedded portal) was packaged by the application to contain not only the appropriate destination for the setup hyperlinks but also name/value pairs reflecting the information that is already known to the application. The name/value pairs, which are described in further detail below, are accompanied by an appropriate trigger for alerting the server of their existence.

Continuing with the example, suppose the user decides to proceed with registration by clicking on the "Register me now" hypertext 332. In response, the embedded portal 331 (shown as 331b) displays HTML page 333, as shown in FIG. 3B. The HTML page 333 includes edit fields 335, for entry of user input. Here, the user can register the product by entering his or her name and e-mail address. As shown in FIG. 3C, the embedded portal 331 (shown as 331c) now displays a Web page 337 having fields 338 for entering a user name and password.

D. Internal Operation

1. Embedded Browser View (Window)

The embedded browser view itself may be created in a conventional manner. With the embedding of Microsoft® Internet Explorer by Microsoft into the Microsoft® Windows operating system, Internet Explorer is available as a Windows child control—that is, a browser window or view may be embedded within an application (parent process), with support provided by the underlying Internet Explorer browser engine (from a pre-existing installation).

For instance, Microsoft® Visual C++ Professional Edition (Microsoft Part No. X03-48668) includes Microsoft Foundation Class (MFC) classes for retrieving files and information using Internet protocols such as FTP and HTTP, and MFC classes for extending Web servers with custom programming. In particular, Microsoft Visual C++'s CHtmlView class allows an application to host Dynamic HTML within an MFC application. With CHtmlView, an application can display HTML pages that contain Dynamic HTML just as a Web browser would display them. Here, the CHtmlView class provides the functionality of a "WebBrowser" control within the context of MFC's document/view architecture. The WebBrowser control is a window in which the user can browse sites on the World Wide Web, as well as folders in the local file system and on a network. The WebBrowser control supports Web browsing through hyperlinks and Uniform Resource Locator (URL) navigation. The control maintains a history list that allows the user to browse forward and backward through previously-browsed sites, folders, and documents. The control directly handles the navigation, hyperlinks, history lists, favorites, and security. Applications can also use the WebBrowser control as an Active document container to host Active Documents. Thus, richly-formatted documents such as Microsoft Excel spreadsheets or Microsoft Word documents can be opened and edited in-place from within the WebBrowser control. The WebBrowser control is also an ActiveX control container that can host any ActiveX control. Thus by using a WebBrowser control, a Web browser-style application can access information from the Internet (such as HTML or Active documents) or an intranet, as well as folders in the local file system and on a network, all within a Web browser view embedded in the application.

Further description of the Microsoft® Visual C++"WebBrowser" control, including description of the CHtmlView class, is available in the documentation accompanying Microsoft Visual C++; see, e.g., Visual Studio 6.0: MSDN Library, available from Microsoft Corporation (Part No. X03-55262), the disclosure of which is hereby incorporated by reference.

2. Special "Key" Tags

Internally, an application created in accordance with the present invention employs special tags which may be intercepted by and acted upon by the parent process (i.e., the executing application having the embedded browser). Each embedded tag would otherwise be an undefined tag for a normal (i.e., HTML-compatible) browser, as it includes special characters. Here, the tag contains a special section that is ignored by the browser but is intercepted by the parent process. In the system of the present invention, the parent process monitors the embedded portal window and, therefore, may intercept HTML tags or commands before they are acted upon by the "browser" portion of the embedded portal (e.g., the underlying Internet Explorer run-time modules). Here, the application intercepts the special tags, processes and (typically) strips out any information intended specifically for the application (i.e., information relevant to the application's own behavior), and then passes on a cleaned-up version of the link to the browser portion of the embedded portal for browser navigation or processing (e.g., spawning a separate browser view). Accordingly, the Web server can transmit "Web pages" containing special tags that may be intercepted by the parent process, for triggering special behavior at the client machine.

A special "key" tag type is defined, particularly for use in populating the system's registry with information that is useful for controlling embedded portal sessions. In the currently preferred embodiment, the tag is implemented using vendor-defined delimiters and keyword, such as |ACCEPT|, which facilitates recognition of the special tag. Apart from the keyword, the special tag includes two other components: (1) a "real" (legal) HTML tag, and (2) auxiliary information. The real tag represents an HTML-compatible tag (i.e., one which the browser is to process and navigate in response to). The auxiliary information is a set of name/value pairs, to provide further context for the special tag. The name/value pairs are particularly well suited for use in setting registry information, such as Microsoft Windows system registry.

Microsoft Windows (e.g., Windows 98) provides a system registry in the form of a centralized database containing information placed there both by the operating system and by the application programs that it hosts. Physically, the registry is stored as a pair of binary files named USER.DAT and SYSTEM.DAT located in the Windows directory. USER.DAT contains information that is unique to each person using the system, such as user preferences that are restored each time a user logs in. SYSTEM.DAT contains global system settings such as a list of installed hardware devices. Logically, the registry is a unified database entity with a tree-like structure that resembles the directory structure of a disk. An entry in the registry is analogous to a file. The entry consists of two parts: a value name, which identifies the entry just as a filename identifies a file, and a value, which is analogous to a file's data. Entries are stored under keys and subkeys just as files are stored in directories and subdirectories. On a disk volume, the pathname \Programs\Win32\Calc.exe identifies a file named Calc.exe that is stored in the subdirectory \Programs\Win32. Similarly, in the registry, the name HKEY_LOCAL_MACHINE\Security\Provider identifies a value named Provider under the subkey HKEY_LOCAL_MACHINE\Security. Technically, HKEY_LOCAL_MACHINE is a key name and Provider is a subkey name. HKEY_LOCAL_MACHINE is one of six special "root keys" that form the uppermost level of the registry's hierarchy. The others are HKEY_USERS, HKEY_CURRENT_USER, HKEY_CURRENT_CONFIG, HKEY_CLASSES_ROOT, and HKEY_DYN_DATA. For further description of the Windows registry, see e.g., Prosise, J., *Exploring the Windows 95 Registry*, PC Magazine, Nov. 21, 1995, presently available at http://www.zdnet.com/pc-mag/pctech/content/14/20/tu1420.001.html, the disclosure of which is hereby incorporated by reference.

In the particular example of online registration, special tags are used for managing user name and account information. Upon interception of special tags, the application in effect programs itself to store this information by editing the system registry (e.g., Windows registry) for storing user name and account number as registry entries. Since it is stored in a persistent manner as registry information, the context information may be used in subsequent sessions of the embedded portal, without the need for storing browser "cookies." Further, the system may alter the Web content retrieved and displayed in the embedded portal, based on the previously-stored context information. For the registration example, for instance, the embedded portal may instead point to Web pages relevant to registered users, if the stored context information indicates that the user is already registered.

In addition to affecting the content rendered at the embedded portal, key tags are also used to control the specific behavior of the host application itself. The host application may include handlers which are invoked for processing key tags that are intercepted. In the example of registering a user, the entire registration process of the application may be invoked in response to processing a particular key tag directing the application to undertake such activity.

Use of key tags for controlling the parent process (i.e., the application itself) is illustrated in FIGS. 4A-B. Continuing with the online registration example of FIGS. 3A-C, FIG. 4A illustrates use of the embedded portal for setting up synchronization functionality—a feature which requires control of the host application itself (apart from the embedded portal or browser window). User interface screen 400 illustrates the display of the application at this point in time. The embedded portal, now shown at 431a, includes a Web page 433 for setting up synchronization. The Web page 433 includes a "Setup" hypertext tag 434 whose invocation begins the process. Upon user selection ("mouse clicking") of the hypertext tag 434, the system displays application dialog box 450, as shown in FIG. 4B. Note, in particular, that clicking the hypertext tag or link 434 leads to a direct action by the host application—triggering display of one of the application's own dialog boxes. For this example, the dialog box is the application's accessor setup dialog box (e.g., for saving the browser URL and other implementation specific information). Although the Web server triggered display of the application's dialog box, no executable program code itself was downloaded to achieve this effect. Instead, the Web server simply triggered invocation of the application's own executable code, through use of a special key tag embedded in an HTML page that the Web server published to the embedded portal. By allowing the parent process (application) to act on information monitored from the HTML pages displayed at the embedded portal, the present invention affords a means by which a Web server may communicate with and control a parent process (application) directly. As a result, an application developer may use the approach to invoke functionality of the host application, particularly when such functionality would be difficult to emulate through Web pages, thereby achieving an embedded portal presenting individualized, highly-relevant content to the particular user.

Figure 5A:
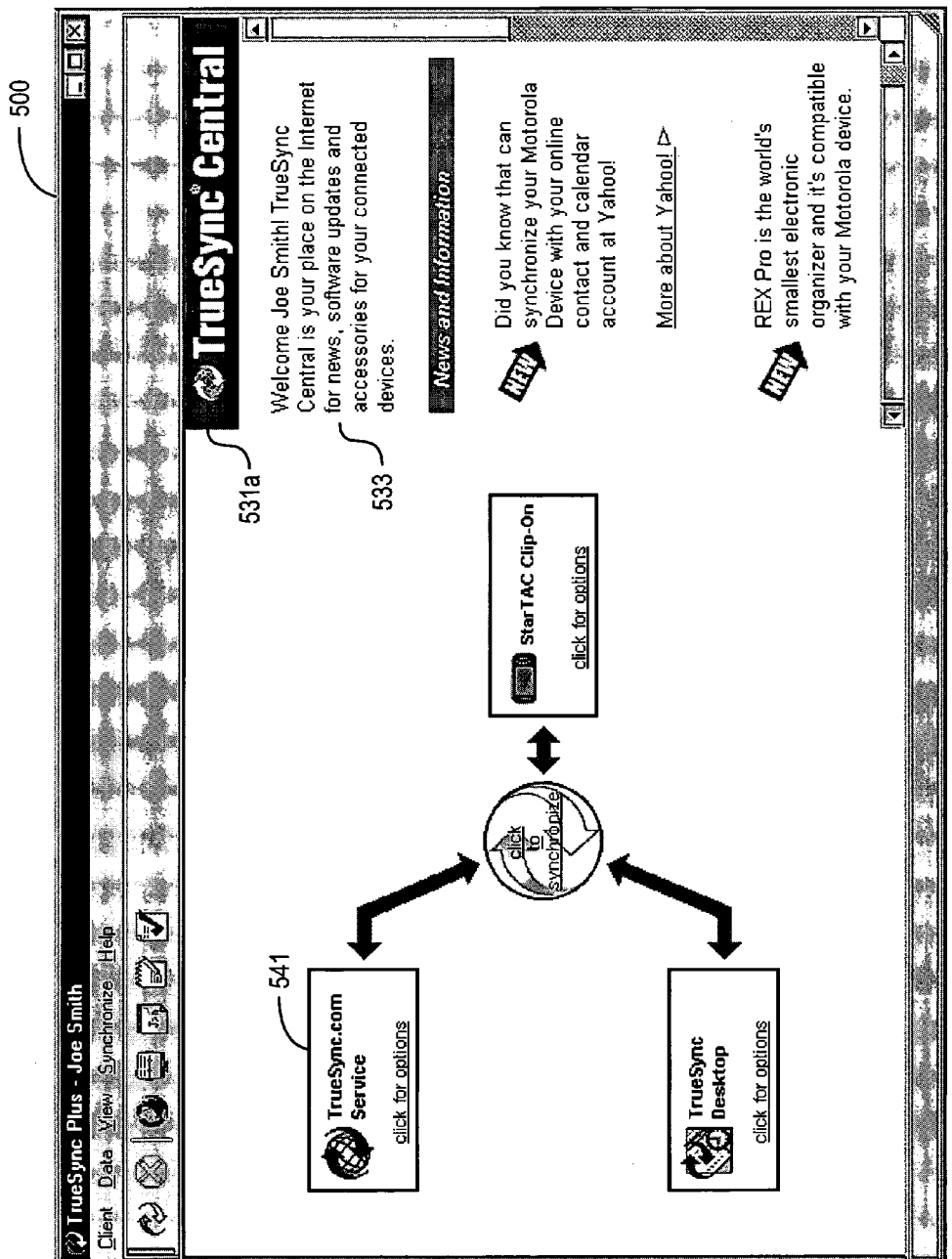

Concluding the online registration example, FIG. 5A illustrates a sample view of the application upon completion of online registration. Via the customized embedded portal, the user will now get updates and information concerning the particular product and its particular use (e.g., based on user input). The application's user interface screen 500, at this point in time, is illustrated in FIG. 5A. As shown, the embedded portal (shown at 531*a*) now displays an embedded portal presenting Web pages (e.g., 533) that are customized for this particular user, based on specific input in the application. Also shown, the application itself has, apart from the embedded portal, been customized to include a new accessor component 541 (i.e., a component that facilitates access, including saving the browser URL and other implementation specific information). This represents that the application may now also synchronize to the Internet-based synchronization server (TrueSync.com), as a result of the user having completed the online registration process—in particular, having completed Setup Dialog 450, as shown in FIG. 4B.

Figure 5B:
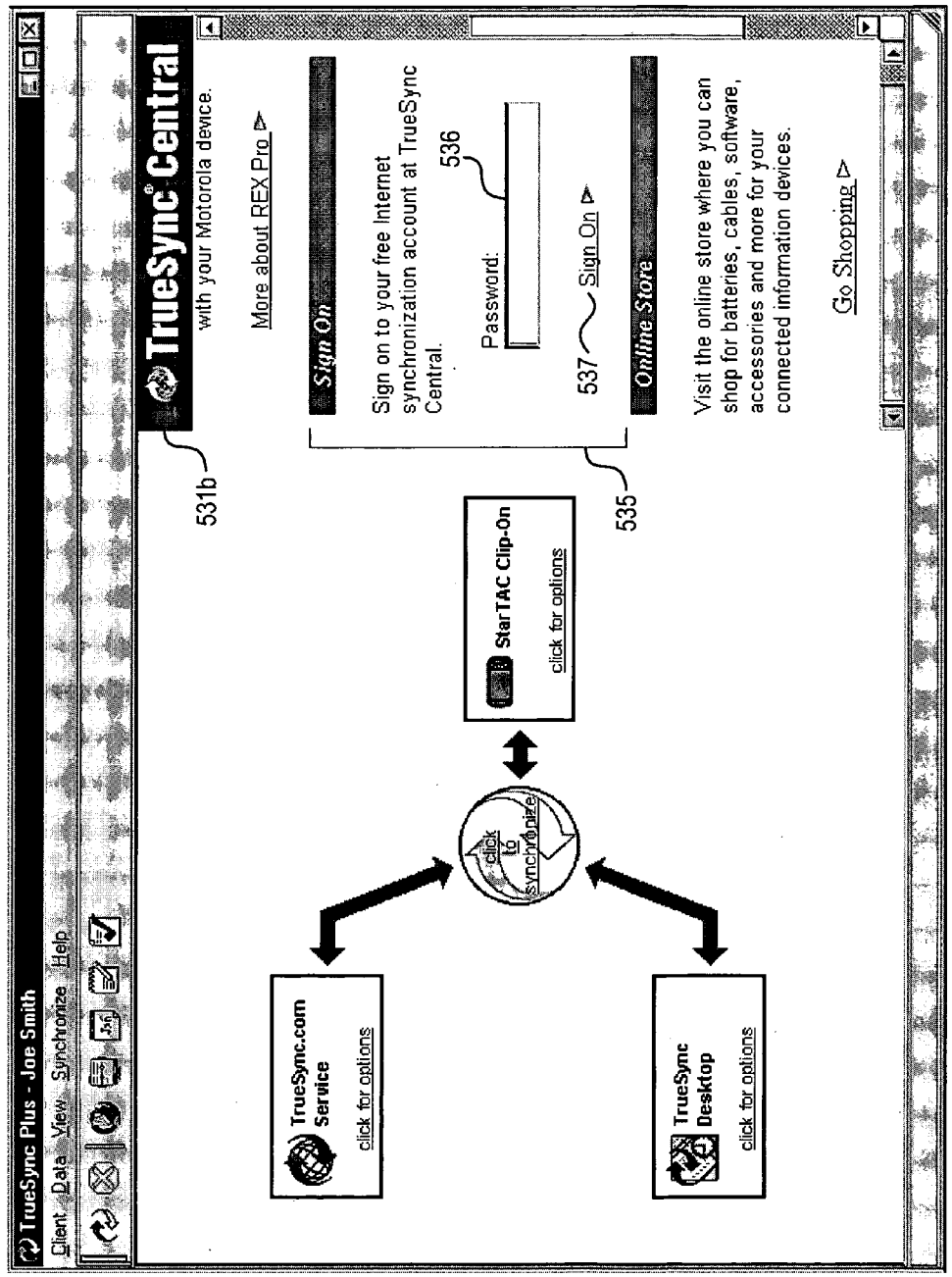
Figure 5C:
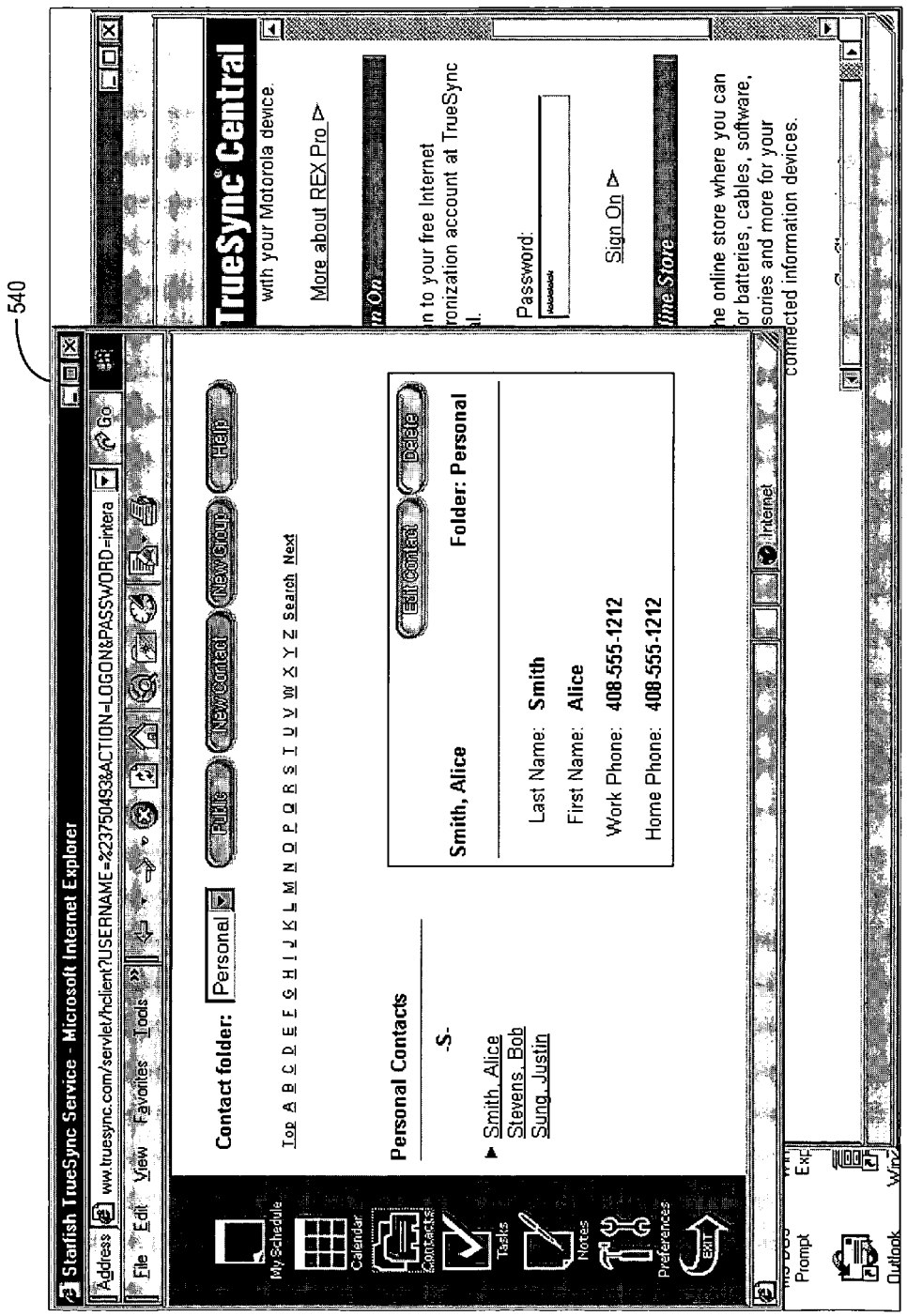
Figure 5D:
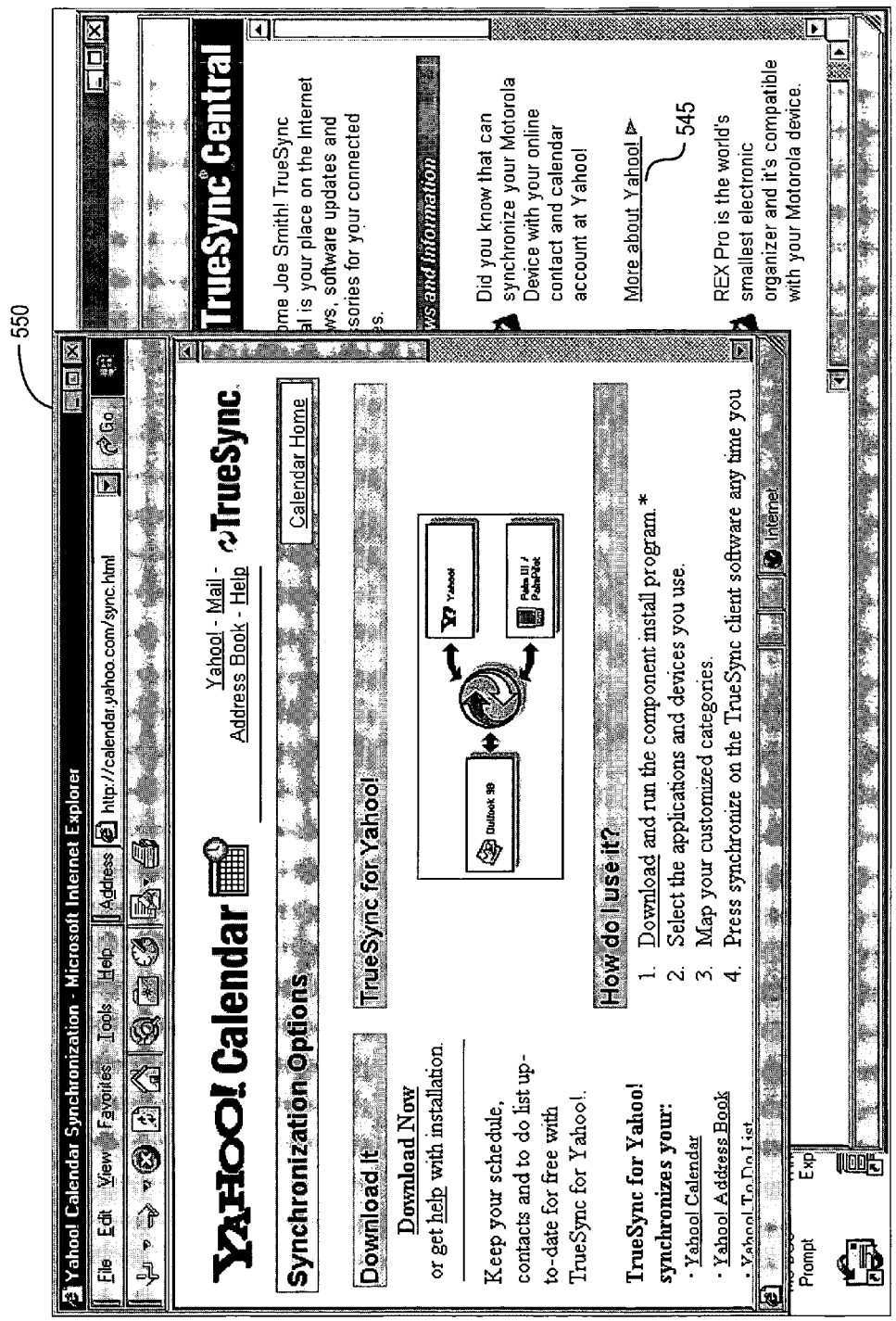

As part of the embedded portal view, the application includes a click-link to a sign-on dialog for accessing the synchronization server online. For instance, as illustrated in FIG. 5B, the user can scroll down the Web page displayed in the portal view 531*b* for displaying a sign-on portion 535 of the page. Upon the user entering his or her password in input field 536 and clicking the "Sign On" click-link or hypertext 537, the application spawns a separate browser view 540 (e.g., Microsoft Internet Explorer or Netscape Navigator session), as demonstrated in FIG. 5C. Thus as illustrated, invoking the click-link 537 launches a browser view which takes the user directly to the online synchronization server, where the user may access his or her own user-specific information (e.g., Address Book or "Contacts" information) using an online personal information manager feature of the synchronization server. The click-link may of course point to other targets, as desired. For example as illustrated in FIG. 5D, user invocation of the "More about Yahoo" Link 545 launches a separate browser view 550 for Yahoo Calendar.

3. Summary of Embedded Portal Methodology

FIG. 6 presents a flowchart 600 summarizing the overall methodology of the present invention. The methodology is invoked with the context that an application (parent process) having an embedded browser view ("portal"), as previously described, is available for participating in the process. At the outset, a special tag type ("key" tag) is defined for allowing a Web server to communicate with and control a particular desktop application (i.e., user application executing at a client machine), as represented by step 601. Next, as indicated by step 602, the Web server publishes to the desktop application a Web page (e.g., HTML page) that includes at least one of the key tags. The desktop application itself includes an embedded browser window ("portal") that is capable of rendering the Web server-published Web page. At this point, the embedded browser window proceeds to display the published Web page. Now, at the desktop application, the user invokes or "clicks" on a Web link that is associated with one of the key tags. Before the tag is acted upon by the browser (portion of the embedded portal), the application (parent process) traps the tag. This is done by trapping "browse to" events which occur in response to a user clicking a hyperlink, as indicated by step 603. Because the embedded portal is being hosted by the desktop application (e.g., as a Microsoft Internet Explorer child control), the desktop application is, in fact, a parent process which may "hook" into the embedded portal. In particular, the application is interested in obtaining a notification every time the embedded portal is about to navigate to a new location (typically, in response to a user clicking on a Web link rendered at the embedded portal). Therefore, the application is able to monitor the embedded portal by trapping "browse to" events that occur at the portal.

Upon trapping a "browse to" event, the application will determine whether the trapped tag (associated with the trapped event) indeed includes any relevant key tags, as indicated by step 604. In other words, the application itself will decide whether the trapped tag contains any information that is relevant to the application itself. Here, the application performs a simple substring search on the trapped tag, for determining whether it comprises a keyword identifier in a key tag, such as a defined keyword identifier of |ACCEPT|. Those skilled in the art will appreciate that a multitude of other keywords may be employed; however, it is preferable to choose a keyword which is undefined in HTML, so that the tag will simply be ignored by the HTML browser (engine portion). If the keyword is not found (i.e., the tag is not a key tag), tested at step 605, the trapped tag is simply passed through to the browser (engine portion) for appropriate browser processing (e.g., navigating to a new Web address), as indicated by step 606. The embedded tag will be simply ignored by the browser if the raw URL is not intercepted. On the other hand, if the keyword is found, then the tag will be processed as a special key tag.

To understand processing of the tag, it is helpful to review the actual layout or structure of a key tag, as illustrated in FIG. 7. The key tag is structured such that its contents are formatted into discrete sections. As shown, the tag structure 700 comprises a keyword section 710, an actual or "real" tag section 720, and a variable data section 730. The various sections are separated by a delimiter character 740 such as a vertical bar (e.g., "|" character), so that the entire contents of the tag is encapsulated within delimiter characters. The keyword section 710 stores the actual keyword string itself (e.g., "ACCEPT"). The "real" tag section 720 stores the true HTML tags—that is, information indicating what the "real" (i.e., legal HTML-compatible) tag should have been. Thus after processing of the special tag (i.e. after processing information from variable data section 730), the real tag section 720 is employed to pass to the browser (engine portion) a valid HTML tag for processing by the browser, for navigating to an actual HTML target (e.g., Web page) which the browser should jump to. The variable data section 730 comprises a variable number of data entries, each expressed as a name/value (string) pair. In the currently-preferred embodiment, name/value entries correspond directly to changes which are posted to the system registry and which may, therefore, be acted upon appropriately by the parent process (application). If action is required as a result of a particular registry entry, the application performs that action.

Returning to the flowchart 600, processing of the key tag therefore proceeds as follows. At step 607, the application invokes its own internal routines (e.g., handlers) that are responsive to the auxiliary information, such as updating the system registry in a predefined, reserved area based on the name/value pairs that are extracted from the tag. Additionally at this point (or at a later point in time), specific functionality of the application may be invoked, as required by the new registry entries. For instance, a registration or setup "Wizard" of the application may be triggered, as previously illustrated. Thus, application functionality may be invoked directly (e.g., through direct invocation of handlers) or indirectly (e.g., through application response to updating of the system registry). After processing of the name/value pairs from the variable data section 730, the system may simply pass the "real" (i.e., valid) HTML tag to the browser (engine portion), for appropriate processing as an HTML tag. Optionally, however, the parent process may first append information to the real tag (e.g., based on the processed name/value pairs), but does so in a manner which preserves validity of the tag. In other words, the parent process has the option of enhancing or otherwise modifying the real tag but will do so in a manner which will allow the tag to be correctly processed by the browser. Therefore, the method proceeds with step 608 indicating optional enhancement of the real tag, and step 609 indicating delivery of the real tag (with or without enhancements) to the browser (engine portion) for processing. Typically, the real HTML tag would be modified by tacking on name/value pairs that are meaningful to the Web server, in a manner similar to how queries are passed from a browser to a Web server (e.g., a "find" query submitted to Yahoo by a browser). Thereafter, the method may loop back to step 603 for processing the next "browse to" event, or terminate if no further tags remain to be processed.

4. Detailed Implementation

FIGS. 8A-C are flowcharts illustrating specific implementation of the methodology of the present invention. As illustrated by the flowchart 800 in FIG. 8A, the process begins by parsing the Web address (i.e., URL), as shown at step 801. This may be implemented in source code, for example, as follows.

```
// Parse the URL.
int iAcceptPos = strURL.Find(kszParseAccept);
CString strBrowseURL = strURL.Mid(iAcceptPos
  + sizeof (kszParseAccept) − 1);
CString strValues;
int iValues = strBrowseURL.Find(_T("|"));
if (iValues != −1)
{
  strValues = strBrowseURL.Mid(iValues + 1);
  strBrowseURL = strBrowseURL.Left(iValues);
}
```

Next, the values in the parsed URL are themselves parsed, as indicated by step 802. This may be done as follows.

```
// Parse the values.
CString strSetupAccessor;
int iSetupAccessor = strValues.Find(_T("|"));
if (iSetupAccessor != −1)
{
  strSetupAccessor = strValues.Mid(iSetupAccessor + 1);
  strValues = strValues.Left(iSetupAccessor);
}
```

The terminator or delimiter itself (i.e., the "|" character) is parsed, at step 803, using the following approach.

```
// Parse the terminator.
int iTerminator = strSetupAccessor.Find(_T("|"));
if (iTerminator != −1)
{
  strSetupAccessor = strSetupAccessor.Left(iTerminator);
}
```

Now, the method may parse the value pairs, at step 804, and then parse each individual value pair, at step 805. The former may be implemented in source code as follows.

```
[ . . . ]
// Parse the value pairs.
TSRegistry regData;
TSString strKey(kServiceKey);
strKey += _T("\\Data\\") + TSApplication::User ( );
regData.Open(strKey, true);
while (!strValues.IsEmpty( ))
{
  // Get the next value pair.
  CString strValuePair;
  int iValuePairTerminator = strValues.Find(_T("&"));
  if (iValuePairTerminator != −1)
  {
    strValuePair = strValues.Left(iValuePairTerminator);
    strValues = strValues.Mid(iValuePairTerminator + 1);
  }
  else
  {
    strValuePair = strValues;
    strValues = _T(" ");
  }
```

The latter may be implemented as follows.

```
// Parse the value pair.
CString strName;
CString strValue;
int  iNameValueDeliminator  =  strValuePair.Find(_T
  ("="));
if (iNameValueDeliminator != −1)
{
  strName = strValuePair.Left(iNameValueDeliminator);
  strValue = strValuePair.Mid(iNameValueDeliminator +
    1);
}
```

Now, the method may proceed to add the name/value pair (for writing to the system registry) if the value is not blank; otherwise, the value is deleted. This is indicated at step 806, and may be implemented as follows.

```
// Add the name/value pair if the value is not blank.
if (!strName.IsEmpty( ))
{
```

```
if (!strValue.IsEmpty( ))
    regData.Write(strName, strValue);
// Otherwise delete it.
else
    regData.DeleteValue(strName);
    }
}
}
regData.Close( );
```

Proceeding to the next phase of the process, at step 807 the method updates the browser URL with the newly-added registry information. This may be implemented as follows, with the following method invocation.

```
// Update the browser URL with the newly added registry
information.
    strBrowseURL = m_pwndParent->BuildLink(strBrow-
seURL);
```

At step 808, the method saves the browser URL and sets up the accessor, as a signal that action is required (i.e., invocation of an OnNavigateComplete2 method). This corresponds to the following assignments.

| m_strBrowseURL | = strBrowseURL; |
|---|---|
| m_strSetupAccessor | = strSetupAccessor; |

Finally, the method navigates to the browser URL that is supplied, at step 809, as follows.

```
// Navigate to the browser URL supplied.
    m_wndBrowser.Navigate(strBrowseURL, NULL,
NULL, NULL, NULL);
// . . .
```

The low-level tag processing performed by the methodology of the present invention is itself illustrated by flowchart 820, in FIG. 8B. At step 821, the method identifies whether an UPDATE or ACCEPT tag is encountered. For an UPDATE tag, the method will proceed to step 827 below; otherwise, the method will proceed to step 822. At step 822, the method parses the ACCEPT tag, using the following syntax:

|ACCEPT|<browse-URL>|<name-value-pairs>|<auto-setup-client>| where browse-URL is the URL to browse to after the tag has been processed; name-value-pairs is zero or more name/value pairs to be stored in the registry; and auto-setup-client is the name of the client to automatically setup (or is blank). The syntax for the name/value pairs may itself adopt a conventional name/value scheme (e.g., similar to Windows .ini files), such as:

[name1=value1] [,name2=value2] [,nameN=valueN]

At step 823, the method stores the name/value pairs in the system (e.g., Windows) registry for the current user. For this particular example implementation on the Windows platform, for instance, this is stored under the "Service" section for "Starfish/TrueSync" software. At step 824, the method takes the browse-URL specified and automatically appends all name/value pairs in the registry for the current user (e.g., under the Service section for Starfish/TrueSync software). Now, at step 825, the system browses to the URL generated in step 824. Upon successful navigation in step 825, the method automatically sets up, at step 826, the client that was previously specified (i.e., in step 822), if any, and then proceeds proceed to step 831.

Parsing of the update tag itself occurs at step 827, using the following syntax:

|UPDATE|<browse-URL>| where browse-URL is the URL to browse to after the tag has been processed. Thereafter, the method proceeds to launch the TrueSync Component Install program (or other specified program of interest), as indicated by step 828. At step 829, the method takes the browse-URL specified and automatically appends all name/value pairs in the system registry for the current user (e.g., under the Service section for Starfish/TrueSync software in the Windows registry). At step 830, the method proceeds to browse to the URL generated in step 829. Finally, at step 831, the system may resume normal application operations (for this example, normal operation of the TrueSync application).

FIG. 8C summarizes the approach for the parent application (e.g., TrueSync) to use the embedded browser view (i.e., Microsoft Browser Control). At step 841, the Microsoft OLE control classes, including the Microsoft Web browser control, are automatically generated using previously-mentioned Microsoft Visual Studio (available from Microsoft Corporation, of Redmond, Wash.), for use in the parent application. Specifically, this may be done by invoking the Project|Add to Project|Components and Controls . . . feature of that development tool and selecting the Registered ActiveX Controls and Microsoft Web Browser control options. The code for a class called CWebBrowserN (where N is a number generated by Visual Studio) is automatically generated; this serves as a wrapper for the Microsoft Web Browser control (CLSID: 8856-F961-340A-11D0-A96B-00C0-4FD7-05A2). Internet Explorer 4.0 or later is needed for supporting an ActiveX Web Browser Control. As illustrated at step 842, the developer may now derive a class from CDialog (from Microsoft Foundation Class library in Visual Studio) to contain the Web Browser control specified in step 841. Now, the parent application may intercept OnBeforeNavigate2( ) notifications to scan for the ACCEPT or UPDATE tags, as indicated by step 843, and intercept OnNavigateComplete2( ) notifications to perform post-browse processing, as indicated by step 844. Additionally, the parent application implements scanning routine to convert hex sequences in URLs to ASCII characters (e.g., the hex sequence 0x20 is converted into an ASCII space character, as indicated by step 845). Finally, the parent application instantiates the wrapper class specified in step 842 in the main application window to provide embedded browsing capabilities.

Appended herewith is Appendix A comprising example HTML listings, providing further description of the present invention. The examples demonstrate use of the ACCEPT and UPDATE tags.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

Example HTML script #1:

```
<html>
<head>
<title>Setup Account</title>
</head>
<body bgcolor=FFFFE4>
<SCRIPT>
function goBack( )
{
    history.back( );
}
</SCRIPT>
<TSS IF (REGISTER_IS_OK_BROWSER)>
<TSS IF (REGISTER_Has_Account_ID)>
<SCRIPT>
function getSetupSubmit( )
{
    return "Setup".link("|ACCEPT|http://" + location.host + "<TSS
SESSION_GET_SERVLET_URL>?vtsregister=true&T=truesync/index.html&Z=REGISTER_
Form_Startup|ACCOUNTID=<TSS REGISTER_GET_LAST_ACCOUNT_ID>&SN_002=<TSS
REGISTER_GET_LAST_LOGIN_NAME>&PN_002=<TSS
REGISTER_GET_LAST_PASSWORD>|Truesync.com service|");
}
</SCRIPT>
<TSS SESSION_TEST_URL_QUERY_PARAMETER(ISNEW)>
<TSS IF (SESSION_IS_VALID_URL_QUERY_PARAMETER)>
<p><small><font face=Arial>Your Internet account has been registered at
TrueSync
Central!</font></small></p>
<TSS ENDIF>
<TSS IF_NOT (SESSION_IS_VALID_URL_QUERY_PARAMETER)>
<p><small><font face=Arial>Your Internet account has been verified at
TrueSync
Central. </font></small></p>
<p><FONT FACE=arial size=-1>You are now ready to add trueSync.com for
synchronization.</p>
<TSS ENDIF>
<TABLE WIDTH=100% BORDER=0 CELLSPACING=0 CELLPADDING=1 BGCOLOR=C0D7E7
CC=YES><TD WIDTH=100% BGCOLOR=<TSS
CONFIG_GET_TITLE_BGCOLOR>><STRONG><SMALL><FONT FACE=Arial SIZE=-1
COLOR=White>    TrueSync.com</FONT></SMALL></STRONG></TD>
<TR><TD WIDTH=100% BGCOLOR=C0D7E7 CC=YES><P TITLE=" " STYLE="margin-top: 5;
margin-left: 5; margin-right: 5;"><small><font face=Arial>Click
<strong>setup</strong> to start the TrueSync Plus setup wizard. This will
guide you through adding TrueSync.com for synchronization with your other
clients.</font></small><FONT face="Arial">  <A href="<TSS
SESSION_GET_SERVLET_URL>?vtsregister=true&T=truesync/moreinfo.html"><SMALL>
Find out more </SMALL></A></FONT></p>
<P ALIGN="CENTER" STYLE="margin-bottom: 15;"><small><font
face=Arial><script>document.write(getSetupSubmit())</script>
</font></small><img src=/+/DBArrow.gif alt="DBArrow.gif (844 bytes)"
WIDTH=13 HEIGHT=11></p>
<TSS ENDIF>
<TSS IF_NOT (REGISTER_Has_Account_ID)>
<p style="background-color: rgb(0,128,192); color:
rgb(255,255,255)"><em><strong><small><font face=Arial>   
Sorry, verification failed!</font></small></strong></em></p>
<p><small><font face=Arial> An invalid Username/Password combination was
received. Please go back and try again.</font></small></p>
<p align=center><small><font face=Arial><img src=/+/DBBack.gif
alt="DBBack.gif (846 bytes)" WIDTH=13 HEIGHT=11> <a
href="javascript:goBack( )">Back</a>
</TD></TR></TABLE>
<TSS ENDIF>
<TSS ENDIF>
<TSS IF_NOT (REGISTER_IS_OK_BROWSER)>
<p><small><font face=Arial>In order to setup TrueSync.com, remember your
username and password, then select the Client/Add/Service menu and follow
the directions.<font></small></p>
<TSS ENDIF>
</body>
</html>
<!--
 Copyright (c) 1999 Starfish Software Corp. All Rights Reserved.
 $Workfile: setup.html $
-->
```

APPENDIX A-continued

Example HTML script #2:

```
<SCRIPT>
function getSetupSubmit( )
{
    return "Product Updates".link("|UPDATE|http://" + location.host +
"<TSS
SESSION_GET_SERVLET_URL>?vtsregister=true&T=truesync/index.html&Z=REGISTER_
Form_Startup|Truesync.com service|");
}
</SCRIPT>
<TR BGCOLOR=#f0e0c4><TD WIDTH=15%><IMG SRC=/+/install.gif ALT="Product
Updates" BORDER=0 HSPACE=0></TD>
<TD><FONT FACE=Arial SIZE=-1>Run
<script>document.write(getSetupSubmit())</script> to install new accessors
or update existing components.</FONT></TD></TR>
<!--
 Copyright (c) 1999 Starfish Software Corp. All Rights Reserved.
 $Workfile: productUpdates.html $
-->
```

What is claimed is:

1. A method of sending messages from a web server to a parent application running on a client machine, the parent application having an embedded browser that communicates with the web server, the method including:

the parent application intercepting a web page sent from the web server to the embedded browser, the web page including one or more special key tags encoded with instructions to the parent application, wherein the special key tags are not HTML formatting tags;

the parent application responding to the encoded instructions by triggering a special behavior of the parent application, distinct from displaying the web page; and the embedded browser displaying at least part of the web page other than the special key tags.

2. The method of claim 1, further including the parent application removing the special key tags from the web page and passing the revised web page to the embedded browser for display.

3. The method of claim 1, further including, as the special behavior of the parent application, running code accessible to the client machine as instructed by the special key tags, wherein the code is not part of the embedded browser and not downloaded with the web page.

4. The method of claim 1, further including, as the special behavior of the parent application, presenting a set-up dialogue to configure the parent application.

5. The method of claim 3, further including, as the special behavior of the parent application, presenting a set-up dialogue to configure the parent application.

6. The method of claim 1, further including, as the special behavior of the parent application, modifying a system registry entry corresponding to the parent application.

7. The method of claim 6, wherein the system registry entry includes at least one name/value pair.

8. The method of claim 1, further including, as the special behavior of the parent application, customizing the web page with user-specific information accessible to the parent application and not provided in the intercepted web page.

9. The method of claim 1, further including, as the special behavior of the parent application, invoking a handler routine responsive to instructions in auxiliary information that is part of the special key tags.

10. A parent application adapted to receive messages from a web server by intercepting them, the parent application including:

an embedded browser, embedded in the parent application; and computer-implemented logic adapted to:

intercept a web page from the web server addressed to the embedded browser, the web page including one or more special key tags encoded with instructions to the parent application, wherein the special key tags are not HTML formatting tags;

trigger special behavior of the parent application in response to the encoded instructions, distinct from displaying the web page; and pass to the embedded browser at least part of the intercepted web page for the embedded browser to display.

11. The method of claim 10, further including the parent application removing the special key tags from the web page and passing the revised web page to the browser for display.

12. The method of claim 10, further including, as the special behavior of the parent application, running code accessible to the client machine as instructed by the special key tags, wherein the code is not part of the embedded browser and not downloaded with the web page.

13. The method of claim 11, further including, as the special behavior of the parent application, presenting a set-up dialogue to configure the parent application.

14. The method of claim 10, further including, as the special behavior of the parent application, presenting a set-up dialogue to configure the parent application.

15. The method of claim 10, further including, as the special behavior of the parent application, modifying a system registry entry corresponding to the parent application.

16. The method of claim 15, wherein the system registry entry includes at least one name/value pair.

17. The method of claim 10, further including, as the special behavior of the parent application, customizing the web page with user-specific information accessible to the parent application and not provided in the intercepted web page.

18. The method of claim 10, further including, as the special behavior of the parent application, invoking a handler routine responsive to instructions in auxiliary information that is part of the special key tags.

* * * * *